(12) United States Patent
Manninen

(10) Patent No.: US 9,616,638 B2
(45) Date of Patent: Apr. 11, 2017

(54) MECHANICALLY INTERLOCKED NONWOVEN INDUSTRIAL FABRIC

(71) Applicant: AstenJohnson, Inc., Charleston, SC (US)

(72) Inventor: Allan R. Manninen, Stittsville (CA)

(73) Assignee: AstenJohnson, Inc., Charleston, SC (US)

( * ) Notice: Subject to any disclaimer, the term of this patent is extended or adjusted under 35 U.S.C. 154(b) by 0 days.

(21) Appl. No.: 14/778,835

(22) PCT Filed: Mar. 26, 2014

(86) PCT No.: PCT/CA2014/000288
§ 371 (c)(1),
(2) Date: Sep. 21, 2015

(87) PCT Pub. No.: WO2014/153644
PCT Pub. Date: Oct. 2, 2014

(65) Prior Publication Data
US 2016/0039171 A1    Feb. 11, 2016

(30) Foreign Application Priority Data
Mar. 26, 2013  (CA) ..................................... 2810605

(51) Int. Cl.
*B32B 3/24* (2006.01)
*B32B 5/02* (2006.01)
(Continued)

(52) U.S. Cl.
CPC ............ *B32B 5/022* (2013.01); *B29C 65/607* (2013.01); *B29C 65/608* (2013.01);
(Continued)

(58) Field of Classification Search
CPC ............ B32B 5/022; Y10T 428/24289; Y10T 428/24281
See application file for complete search history.

(56) References Cited

U.S. PATENT DOCUMENTS

| | | |
|---|---|---|
| 6,124,015 A | 9/2000 | Baker et al. |
| 2003/0190451 A1 | 10/2003 | Baker et al. |

(Continued)

FOREIGN PATENT DOCUMENTS

| | | |
|---|---|---|
| CA | 2388568 A1 | 3/2001 |
| EP | 0793923 A1 | 9/1997 |
| WO | 2011069259 A1 | 6/2011 |

OTHER PUBLICATIONS

International Search Report and Written Opinion dated Jun. 17, 2014 for International Application No. PCT/CA2014/000288, International Filing Date: Mar. 26, 2014 consisting of 12-pages.

*Primary Examiner* — William P Watkins, III
(74) *Attorney, Agent, or Firm* — Christopher & Weisberg, P.A.

(57) ABSTRACT

A nonwoven industrial fabric comprising a first layer secured to a second layer, with each layer comprising a plurality of flow-through apertures and profiling protrusions, wherein: a) at least a portion of the flow-through apertures of the first layer is aligned with at least a portion of the flow-through apertures of the second layer; b) the first layer comprises a plurality of securing protrusions integral to the first layer; c) the second layer comprises a plurality of detents integral to the second layer; and d) the first layer is secured to the second layer by a plurality of locking pairs, each locking pair comprising a securing protrusion lockably engaged with a detent. A method of making the nonwoven industrial fabric is also described.

15 Claims, 16 Drawing Sheets

(51) Int. Cl.
- *D21F 1/00* (2006.01)
- *B29C 65/60* (2006.01)
- *B29C 65/00* (2006.01)
- *B32B 5/06* (2006.01)
- *B32B 5/26* (2006.01)
- *B32B 15/00* (2006.01)
- *B32B 27/08* (2006.01)
- *B32B 3/26* (2006.01)
- *B29C 65/16* (2006.01)
- *B29C 65/08* (2006.01)
- *B29C 65/48* (2006.01)

(52) U.S. Cl.
CPC ........ *B29C 66/1122* (2013.01); *B29C 66/135* (2013.01); *B29C 66/21* (2013.01); *B29C 66/431* (2013.01); *B29C 66/438* (2013.01); *B29C 66/7252* (2013.01); *B29C 66/7294* (2013.01); *B32B 3/266* (2013.01); *B32B 5/06* (2013.01); *B32B 5/26* (2013.01); *B32B 15/00* (2013.01); *B32B 27/08* (2013.01); *D21F 1/0072* (2013.01); *B29C 65/08* (2013.01); *B29C 65/16* (2013.01); *B29C 65/48* (2013.01); *B29C 66/71* (2013.01); *B29C 66/712* (2013.01); *B29C 66/73161* (2013.01); *B29C 66/73521* (2013.01); *B29C 66/73921* (2013.01); *B29C 66/73941* (2013.01); *B29K 2995/0072* (2013.01); *B32B 2250/02* (2013.01); *B32B 2250/20* (2013.01); *B32B 2262/02* (2013.01); *Y10T 428/24281* (2015.01); *Y10T 428/24289* (2015.01)

(56) References Cited

U.S. PATENT DOCUMENTS

2005/0233111 A1    10/2005    Best
2012/0244311 A1*   9/2012     Manninen ........... B29C 65/5035
                                                              428/133

* cited by examiner

MECHANICALLY INTERLOCKED NONWOVEN INDUSTRIAL FABRIC

CROSS-REFERENCE TO RELATED APPLICATIONS

This application is a submission under 35 U.S.C. §371 for U.S. National Stage Application of, and claiming priority to, International Application Number PCT/CA2014/000288, entitled MECHANICALLY INTERLOCKED NONWOVEN INDUSTRIAL FABRIC, filed Mar. 26, 2014, which International Application is related to and claims priority to Canadian Application Serial No. 2,810,605, filed Mar. 26, 2013, the entirety of all of which is incorporated herein by reference.

TECHNICAL FIELD

The present disclosure relates to nonwoven industrial fabrics. In particular, it relates to industrial fabrics that include mechanically interlocked, apertured and profiled film layers or sheets.

BACKGROUND

Industrial fabrics used in filtration and conveying applications, such as papermaking and the like, are typically formed by interweaving a plurality of polymeric yarns (such as monofilaments, multifilaments, cabled yarns and the like) according to a chosen pattern using an industrial loom. The fabrics are usually woven flat and then subsequently joined along their longitudinal edges by a seam. The fabrics may also be woven without ends, in a tubular form, to a specified width and length, and subsequently installed on a particular machine. Such fabrics can also be produced from one or more modules of nonwoven yarn arrays in which the component yarns are laid parallel to one another and held in place by adhesives and batt material needled through the array.

These fabrics are highly specialized constructions that are designed to be uniquely suitable for their intended end use application. Due to the relatively high cost of equipment required to assemble these fabrics, as well as the specialized labour force needed to guide them through various stages of production, manufacturers have searched for lower cost alternatives for their manufacture.

While nonwoven fabrics are more easily produced, there are the many structural requirements imposed by the manufacturing environments. For example, papermaking fabrics designed for use in the forming, press or dryer sections of the papermaking machine, must provide a uniformly smooth, but porous, surface layer to the paper product. The fabrics must be capable of withstanding mechanical forces when running at speeds of 1,000 m/min or more. They must provide an opposing layer resistant to thermal and chemical degradation, as well as abrasion, so as to provide the purchaser with satisfactory performance and service life.

Until recently, it has been very difficult for manufacturers of these industrial fabrics to provide a wholly nonwoven product which satisfies all of the above requirements. Furthermore, the formation of a nonwoven fabric from two or more layers with different properties presents additional problems, as discussed below.

U.S. Pat. No. 5,983,467 discloses the joining of two surfaces by a set of islands provided on one surface engaged within apertures provided on a second surface. The islands are arranged so that there are apertures between sets of adjacent islands. The joined surfaces may be disconnected and reconnected.

U.S. Pat. No. 6,124,015 discloses an industrial fabric having at least one segment including at least one woven or nonwoven ply joined either to itself, or to another ply (or segment) by use of structures or jointing yarns (e.g. hook and loop, or rib and slot) that interlock with each other to form a lap join.

U.S. Pat. No. 6,902,787 discloses a permeable industrial fabric that is assembled from tiles arranged in at least two plies. The two plies are held together by jointing structures that are integral with the tiles. Within each tile, the jointing structures are incorporated at primary selected locations according to a symmetrical pattern. Apertures in the tiles, which provide fabric permeability, are incorporated at secondary and tertiary selected locations according to two more patterns, at least one of which is asymmetrical.

Industrial fabrics formed by mechanically interconnecting one fabric layer or component with a second by means of a fastening arrangement have been disclosed; for example, U.S. Pat. No. 7,220,340 which describes a nonwoven papermaker's dryer or press fabric comprising a layer of MD (machine direction) yarns overlaid with a layer of CD (cross-machine direction) yarns. The yarns are positively connected to one another at their crossing points by one or more of the following: an adhesive, snap-fit (i.e. a peg and hole arrangement such as rivet-type fastener) or by localized melting at the crossing points.

PCT patent application publication WO 2011/069259 discloses industrial fabrics formed from two or more layers of a slit and profiled plastic film having specific characteristics; similar film fabrics have been further described by CA 2,779,969, CA 2,779,131 and CA 2,791,864 (presently unpublished). Other nonwoven fabrics including one or more film layers are known and have been described in WO 2012/028601, WO 2012/095251, WO 2012/100161, WO 2005/042836, WO 2008/145420, WO 2003/068495 and GB 1037003, for example.

US 2003/0190451 discloses an industrial fabric comprising at least two separate layers. The layers are joined by pairs of interlocking structures, with each interlocking structure integral with each layer. The resulting joining of the layers provides a void volume between the layers. The layers may be made from differing thermoplastics so that each layer has different physical properties. The layers may be porous or non-porous.

US 2012/0021171, US 2012/0027997, US 2011/0272112, US 2010/0239814, US 2010/0236740, US 2010/0236034 and US 2010/0230064 disclose various nonwoven film-type industrial fabrics which may include a topographical pattern on a product contact side. However, none of these documents discloses a mechanical interlocking of two or more layers of film or sheet material in which integral protrusions of a first layer are lockably engaged with at least one detent in a second layer.

In the present disclosure, it is shown that a mechanical fastening process may provide the desired flexibility of materials used in each of the layers of an industrial fabric, while simplifying the process by which these layers are interconnected to the one another. It has been found that, by means of the present invention, it is now possible to interconnect two similar or dissimilar profiled and apertured film or sheet materials by means of a mechanical interlocking process such as, hot staking or clinching. By interconnecting the two or more film layers by means of such mechanical fastening process, it is now possible to provide the optimal desired properties to each layer, independently of the properties provided to other layers.

SUMMARY

The nonwoven industrial fabric in its general form will first be described, and then its implementation in terms of preferred embodiments will be detailed hereafter. These embodiments are intended to demonstrate the principle of the product, and the manner of its implementation. The industrial fabric in its broadest and more specific forms will then be further described, and defined, in each of the individual claims which conclude this specification.

The nonwoven industrial fabric is constructed by the mechanical interlocking of at least two layers of material.

Each layer is provided with flow-through apertures to allow fluid movement through the nonwoven fabric from one surface out the other surface. Such fluid movement occurs when flow-through apertures of one layer have some degree of alignment with the flow-through apertures in the other layer In one aspect of the present invention, there is provided a nonwoven industrial fabric comprising a first layer secured to a second layer, with each layer comprising a plurality of flow-through apertures and profiling protrusions, wherein: a) at least a portion of the flow-through apertures of the first layer is aligned with at least a portion of the flow-through apertures of the second layer; b) the first layer comprises a plurality of securing protrusions integral to the first layer; c) the second layer comprises a plurality of detents integral to the second layer; and d) the first layer is secured to the second layer by a plurality of locking pairs, each locking pair comprising a securing protrusion lockably engaged with a detent.

In another aspect of the present invention, there is provided a method of manufacturing a nonwoven industrial fabric, comprising the steps of a) placing a first layer above a second layer, wherein each layer comprises a plurality of flow-through apertures and profiling protrusions; b) aligning at least a portion of the flow-through apertures of the first layer with at least a portion of the flow-through apertures of the second layer; and c) securing the first layer to the second layer by creating a plurality of locking pairs between each layer, with each locking pair comprising a securing protrusion integrally formed from the first layer that is lockably engaged with a detent integrally formed from the second layer.

The plurality of locking pairs may also include at least one locking pair formed by a detent integral to the first layer lockably engaged with a securing protrusion integral to the second layer. In addition, the flow-through apertures of the first layer can be fully aligned with the flow-through apertures of the second layer. The securing protrusions can assume any shape, and can be, for example, cylindrical, frustoconical, block-rectangular, helical, cubic, or pyramidal.

As an example of a locking pair, the securing protrusion can protrude through a detent opening and have an enlarged free end lockably engaged with the detent. In the method described above, step (b) may further comprise i) inserting the securing protrusion through a detent opening; and ii) applying heat and pressure to the securing protrusion to provide an enlarged head that lockably engages with the detent. The detent opening may be located in the profiling protrusion. Furthermore, hot staking may be used to lockably engage the securing protrusion with the detent.

As another example of a locking pair, the detent may comprise constriction of a detent region that receives and retains the securing protrusion. In the method described above, step (b) may further comprise applying heat and pressure to simultaneously create the securing protrusion and detent of each locking pair, with the detent comprising constriction of a detent region that retains the securing protrusion. Furthermore, clinching may be used to lockably engage the securing protrusion with the detent.

An exterior surface of the first and/or second layer may have an averaged surface roughness of between 1 micron and 100 microns.

The first and second layers may both be made from the same material, such as a metal, a thermoplastic or a thermoset. The thermoplastic may be a polyester; for example, polyethylene terephthalate. Bonding may be used to further secure the two layers; where both layers are thermoplastic, bonding methods such as through transmission laser welding; ultrasonic welding, adhesives or chemically-reactive systems may be used. In addition, the surface of at least one the layers may be treated by vapor deposition, a nanoparticle treatment or a plasma treatment.

Alternatively, the first and second layers may be made from different materials, such as a thermoplastic, a thermoset or a metal. That is the two layers may form a metal-thermoset, a metal-thermoplastic, or a thermoset-thermoplastic combination.

In the nonwoven industrial fabric, the thickness of each layer may be the same or different.

The fabric may be constructed by having a first set of abutting strips of the first layer oriented transverse to a second set of abutting strips of the second layer. Or, the fabric may be constructed by having a first set of abutting strips of the first layer oriented parallel to a second set of abutting strips of the second layer. Where the sets of abutting strips are parallel to each other, both sets of strips may be oriented in either a longitudinal direction of the nonwoven fabric, or in a width direction of the nonwoven fabric. Furthermore, each strip of the first layer can overlap a butt join between two abutting strips of the second layer and each strip of the second layer overlaps a butt join between two abutting strips of the first layer.

In the assembly of the nonwoven industrial fabric, the first layer and second layer may each be constructed from a separate sheet. Alternatively, both layers may be constructed from a single sheet that is folded over at least once.

The film or sheet materials used in the layers to construct the nonwoven fabric can be any thermoplastic polymers which are suitable for use in the manufacture of industrial textiles, and which would have sufficient tensile strength, stability, chemical and hydrolysis resistance to suit the intended end use of the finished fabric. The materials can be polymeric films, such as are commonly available, for example a bi-axially oriented thermoplastic polymeric film or sheet of which the polymer has been rendered hydrolysis resistant, or is resistant to heat and hydrolysis by its constitution. Examples of polymeric material include, but are not limited to, hydrolysis-stabilized polyethylene terephthalate (PET), polybutylene terephthalate (PBT), polyethylene, polyethylene naphthalate (PEN), polypropylene (PP), polyphenylene sulphide (PPS), polyether ether ketone (PEEK) and other polymers that are suitable for use in forming monofilaments intended for use in papermachine clothing, such as dryer fabrics and the like. Various nylon polymers, such as polyamide 6, polyamide 6/6, polyamide 6/10 and the like, as well as their copolymers and blends thereof, may also be appropriate materials for use in the film materials for the nonwoven fabrics.

Other materials may be used, including thermoset materials such as polyimides. There are two general types of polyimides. One type, so-called linear polyimides, are made by combining imides into long chains. Aromatic heterocyclic polyimides are the other usual kind, where R' and R" are two carbon atoms of an aromatic ring. Examples of polyimide films include Apical™, Kapton™, UPILEX™, VTEC™ PI, Norton™ TH and Kaptrex.™

The nonwoven fabric can also be made from metals. This includes, but is not limited to, thin steel and aluminum, or other alloys.

It may be desirable to use a different material, for example a thermoset type plastic, as one layer (i.e., that layer which is exposed to abrasive wear or subject to thermal degradation). Thermosets (such as polyimides for example), offer many advantages over thermoplastics (such as PET and other polyesters). Thermosets are very rugged plastics which are not as susceptible to abrasive or thermal degradation as thermoplastics. However, thermosets suffer from the disadvantage that they are not laser weldable and thus may not be used to join one layer to another via a welding process.

In addition, metal materials cannot be used in combination with thermoplastic films in prior art constructions of nonwoven industrial fabrics. However, such restrictions do not apply in the present nonwoven industrial fabric. A metal sheet securely joined with a polymer film, for example, would offer certain advantages including increased fabric stability, abrasion resistance, increased resistance to chemical and thermal degradation, and the ability to dissipate static charge in dry conveying, forming and filtration applications.

Also, it may be desirable to construct a nonwoven industrial fabric with different patterns in each layer. This scenario is not possible in the prior art, as the profiling applied to each layer must be similar in order for the two layers to be bonded together. However, the present nonwoven industrial fabric allows for a mechanical interconnection to be formed between layers, so that it is possible to provide optimal desired properties to each layer independently.

Mechanical interconnections between the layers, as described below, provide a lock between the fabric layers that does not require additional materials (e.g. laser energy absorbents, adhesives, etc.) to connect the layers. The materials of the layers themselves form the connection, and provide additional benefits, such as increased fabric stability and ease of assembly.

As used herein, the following terms have the following definitions.

Nonwoven Industrial Fabric:

a belt or fabric used in an industrial process which is made from two or more interlocked layers of a film or sheet material. The layers are primarily joined together by hot staking or clinching. In addition, chemicals, adhesives, or through-transmission laser welding may be used to supplement the interlocking of the two layers.

Hot Staking:

a process of forming a mechanical interconnection between one or more objects whereby one of the objects is provided with openings which are matched up with stakes protruding from a second object. The objects are aligned such that the stakes on one object penetrate the openings in the second object and protrude there through. A compression head (which may be heated) is brought into alignment with each stake and the head then presses and optionally heats the protruding end of the stake to produce an enlarged head at that end, which mechanically interlocks the two objects together. In hot staking, the securing protrusion (i.e. the stake) is an integral portion of the first object and is lockably engaged with at least one detent (i.e. the perimeter of the opening) integral to the second object.

Clinch Joining:

a process of forming a mechanical interconnection between one or more objects whereby a form and force fitted joint is created between the two layers. Typically a punch, or similar mechanism, applies pressure (and optionally heat) to a selected portion of the two objects while they are held together in intimate contact. The punch deforms both objects simultaneously to produce a cup-like impression so that the deformed portion of one object is nested inside the deformed portion of the other. The outer object is pinched inwardly to the inner object so that it is "clinched" and thus held in position. In clinching, the outer surface of a first of the two layers or objects to be joined includes at least one detent which lockably engages a securing protrusion that is an integral portion of the adjacent layer or object.

Detent:

as used herein, the term "detent" refers to a portion of one layer of an industrial fabric that is sufficiently constricted so as to retain a mechanically deformed portion of a second layer which has been inserted into it. As an example, the detent can be an opening in the surface of one layer that is adapted to receive and interlock with a securing protrusion from a second layer; the securing protrusion is subsequently deformed by the application of pressure and/or heat in order to be retained by the detent. This is exemplified by the hot staking process described above. Alternatively, a detent can be formed by the clinching process described above, in order to retain a deformed protrusion. In the present nonwoven industrial fabrics, one layer of the fabric is interlocked with another by either hot staking or clinching.

The foregoing summarizes the principal features of the industrial nonwoven fabric and some of its optional aspects. The industrial fabric may be further understood by the description of the embodiments which follow.

Wherever ranges of values are referenced within this specification, sub-ranges therein are intended to be included unless otherwise indicated. Where characteristics are attributed to one or another variant, unless otherwise indicated, such characteristics are intended to apply to all other variants where such characteristics are appropriate or compatible with such other variants.

DETAILED DESCRIPTION OF PREFERRED EMBODIMENTS

The following is given by way of illustration only and is not to be considered limitative of the industrial fabric. Many apparent variations are possible without departing from the scope thereof.

Prior Art Constructions

Figure 1:
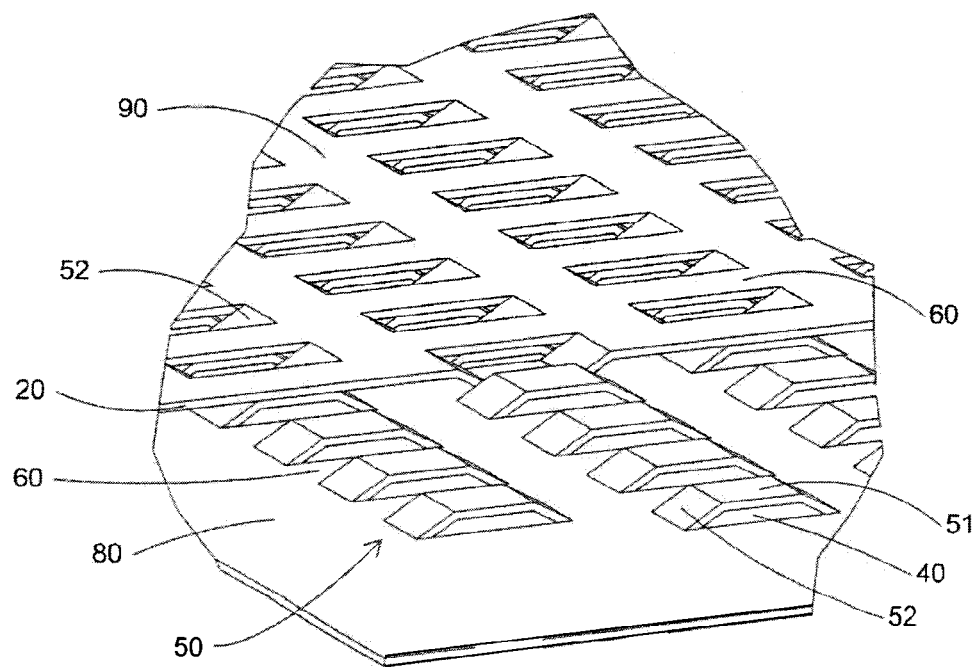
FIG. 1 is a perspective view of a prior art industrial fabric comprised of selectively slit and embossed film.
Figure 2:
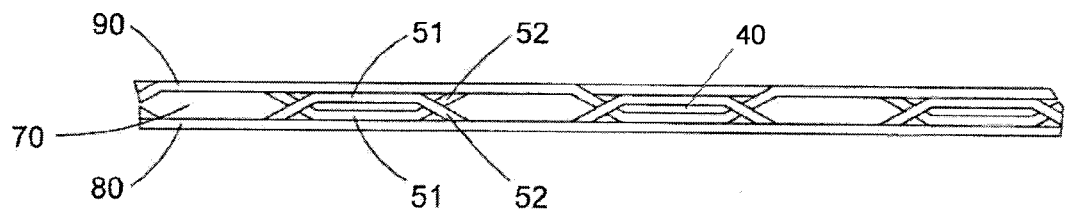
FIG. 2 is a side view of the industrial fabric of FIG. 1.

Referring to FIGS. 1 and 2, FIG. 1 is a perspective view of a prior art film fabric disclosed in WO 2011/069259, and FIG. 2 is a side view of the fabric of FIG. 1. The fabric comprises a two layer arrangement of film sheets 80, 90, each provided with a symmetrical pattern of profiling protrusions 50, each including angular profiling protrusion sides 52 and supporting upper profiling protrusion surfaces 51 defining flow-through apertures 40 within each profiling protrusion. The profiling protrusions 50 are arranged in symmetrical regular rows and each profiling protrusion 50 is separated by land areas 60 from adjacent profiling protrusions. In this embodiment, upper sheet 90 is placed in an offset position in relation to lower sheet 80, so that each profiling protrusion 50 of upper sheet 90 is located over a land area 60 of lower sheet 80, and profiling protrusions 50 on sheet 80 are located under land areas 60 between profiling protrusions 50 on upper sheet 90. Flow-through apertures 40 in upper sheet 90 are located between flow-through apertures 40 in lower sheet 80, and the two sheets are spaced apart in the direction perpendicular to the their respective planes. As best seen in FIG. 2, this creates passages 70 between opposing land areas 60 between the rows of profiling protrusions 50 in the two layers and flow through openings formed by the alignment of flow-through apertures 40.

The flat tops 51 of the profiling protrusions 50 are dimensioned so as to lie flat on the planar land areas 60 to maximize contact at that point between the first and second layers of film; this in turn maximizes bond strength when the two layers are bonded together such as by laser welding. Also, the profiling protrusions 50 are nested between each other adjacent to the land areas 60, thus bracing this contact point between other raised areas. This serves to increase the overall dimensional stability of the fabric structure as the bracing will resist lateral movement of one layer relative to the other. Bonding the two layers, for example, by laser welding may only need to be performed at every second, third, fourth or other point where a profiling protrusion 50 and land area 60 are mated. The number of welds or bonds per unit area required to provide a stable and coherent fabric structure will depend on various physical factors involved, including the properties of the film used, and the intended end use of the fabric. Alternatively, or in addition to bonding, the sheets 80 and 90 can be secured together by inserting a continuous material such as a monofilament through the passages formed by aligned flow-through apertures 40.

In the prior art fabrics shown in FIGS. 1 and 2, each of the two layers 80, 90 are ideally made of a thermoplastic polymer material such as polyethylene terephthalate (PET) which, when provided with a laser energy absorbent material, will be both compatible and amenable to through transmission laser welding (TTLW) so as to securely join the layers together. Further, the thickness of each layer of material 80, 90 should ideally be the same, or nearly so, so that the flow-through apertures and profiling protrusions of each layer can be securely intermeshed prior to bonding. The only practical means of mechanically interconnecting the layers 80, 90 once they have been intermeshed, without creating other disadvantages, is to insert yarns across the width of the assembled structure in the manner previously described.

Figure 3:
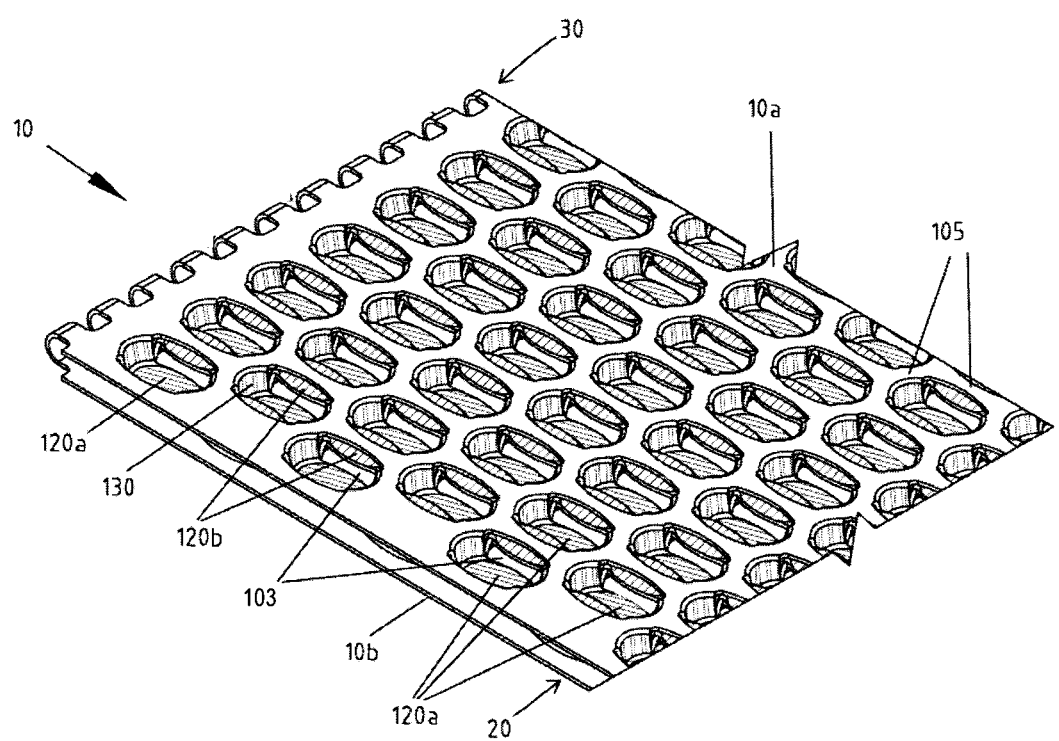
FIG. 3 is a perspective view of a prior art self-locking nonwoven industrial fabric.

FIG. 3 is a perspective view of a portion of a prior art self-locking industrial fabric 10 as disclosed in CA 2,791, 864. The fabric is comprised of two similarly profiled film layers 10a, 10b and, in this view, includes a seam region 30. Each profiled film layer includes a plurality of generally frustoconical protrusions (not shown) each including a generally planar elliptical top surface such as 120a, supported by end walls 130, and between which are located flow-through apertures 103. The profiled film layers 10a, 10b of the self-locking industrial fabric shown in FIG. 3 are mechanically joined together by locating the profiling protrusions of a first layer 10a such that they are in alignment with, and in between, the corresponding profiling protrusions in a second film layer 10b. A relatively small amount of pressure is then applied so as to snap the planar top surfaces 120a of the profiling protrusions of first film layer 10a into the corresponding but smaller available space between top surfaces 120b of the profiling protrusions of second film layer 10b. Due to the deformable nature of the film 20, and because the sidewalls (not shown) of each profiling protrusion have been removed in a previous preparation step to provide flow-through apertures 103, the top surfaces 120a, 120b of the profiling protrusions can bend slightly to allow these surfaces to slip past one another. Once past, the top surfaces 120 snap back into their previous planar conformation due to the open space provided on each side by flow-through apertures 103 and are now secured in position such that one is above the other, and each is resting on planar regions 105 located between each profiling protrusion of each of the film layers. The strength of the securing action (and conversely of the snap) will be a function of various factors, including the film's resistance to deformation (e.g. Young's modulus), the amount of overlap that exists between the locking features (i.e. the planar top surfaces 120a as they fit into the flow-through apertures 103), their geometry, the pitch or spacing between adjacent profiling protrusions, and film thickness; other factors may have relevance as well. If further securing is considered advantageous for a specific end use, any unwanted relative movement between the layers can be prevented or minimized by bonding the top surfaces 120a, 120b of the profiling protrusions of each layer to the planar surfaces 105 of the film in the opposing layer, at all or selected ones of the connection points between the two layers.

First Embodiment

FIGS. 4 to 7 illustrate a first embodiment of a mechanically interlocked, apertured and profiled industrial fabric.

Figure 4:
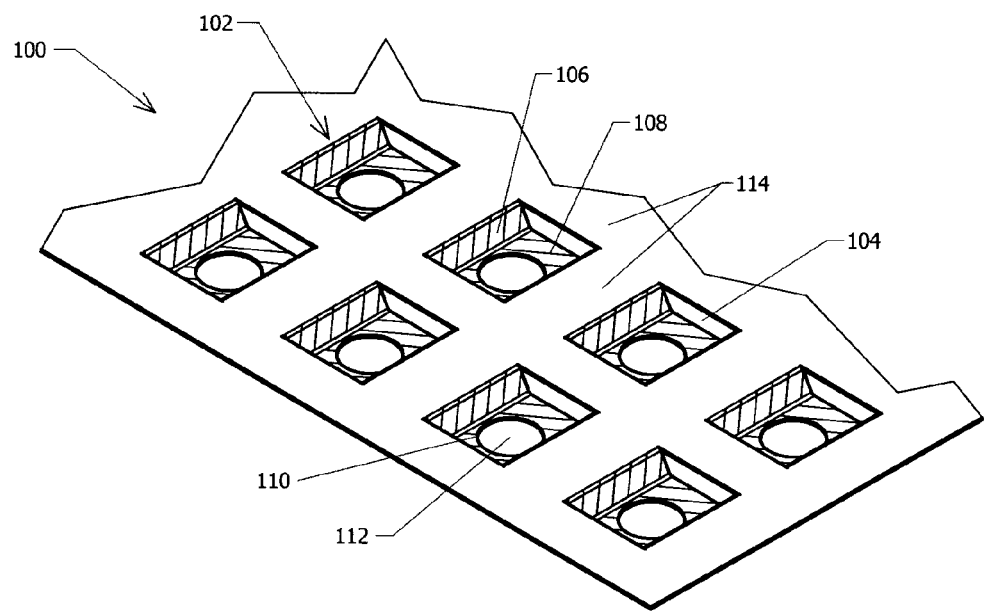
FIG. 4 is a perspective view of a first layer for use in constructing a nonwoven industrial fabric according to a first embodiment.

FIG. 4 is a perspective view of a portion of a surface of a first profiled layer 100 for use in a first embodiment. The layer 100 is joined to a second profiled layer 150 shown in FIG. 5. Layer 100 includes profiling protrusions 102 including flow-through apertures 104 which, in this embodiment, may be formed in a manner analogous to the flow-through apertures 40 shown in the prior art fabric of FIGS. 1 and 2 and as described in WO 2011/069259. The profiling protrusions 102 are regularly arranged in the surface of layer 100 such that there are planar land areas 114 between each of the profiling protrusions. Upper surface 108 of each profiling protrusion 102 is provided with a detent opening 112 defined by the edge of a detent 110. Detent opening 112, which is shown here as being generally circular in shape, may be shaped as desired, but with the requirement that it must accommodate and mate with a securing protrusion 152 from second layer 150 in a manner which will allow it to form a detent 110 to lock securing protrusions 152 in position. Land areas 114 may be of any desired size or shape, provided that profiling protrusions 102 and detent openings 112 can be located so as to be mated with corresponding securing protrusions 152 in second layer 150.

Figure 5:
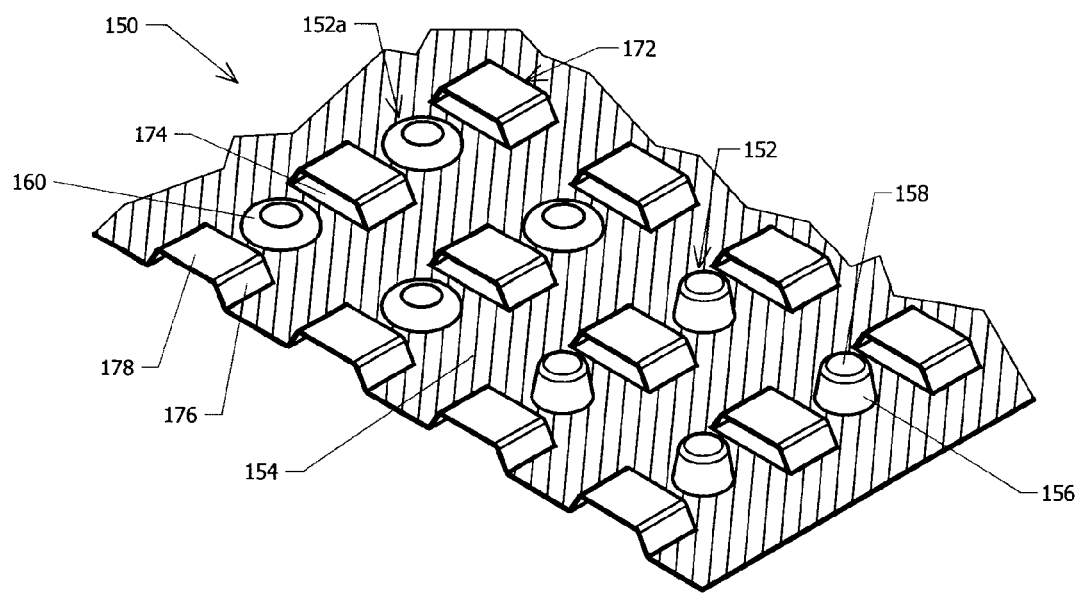
FIG. 5 is a perspective view of a second layer for use in constructing a nonwoven industrial fabric according to the first embodiment.
Figure 6:
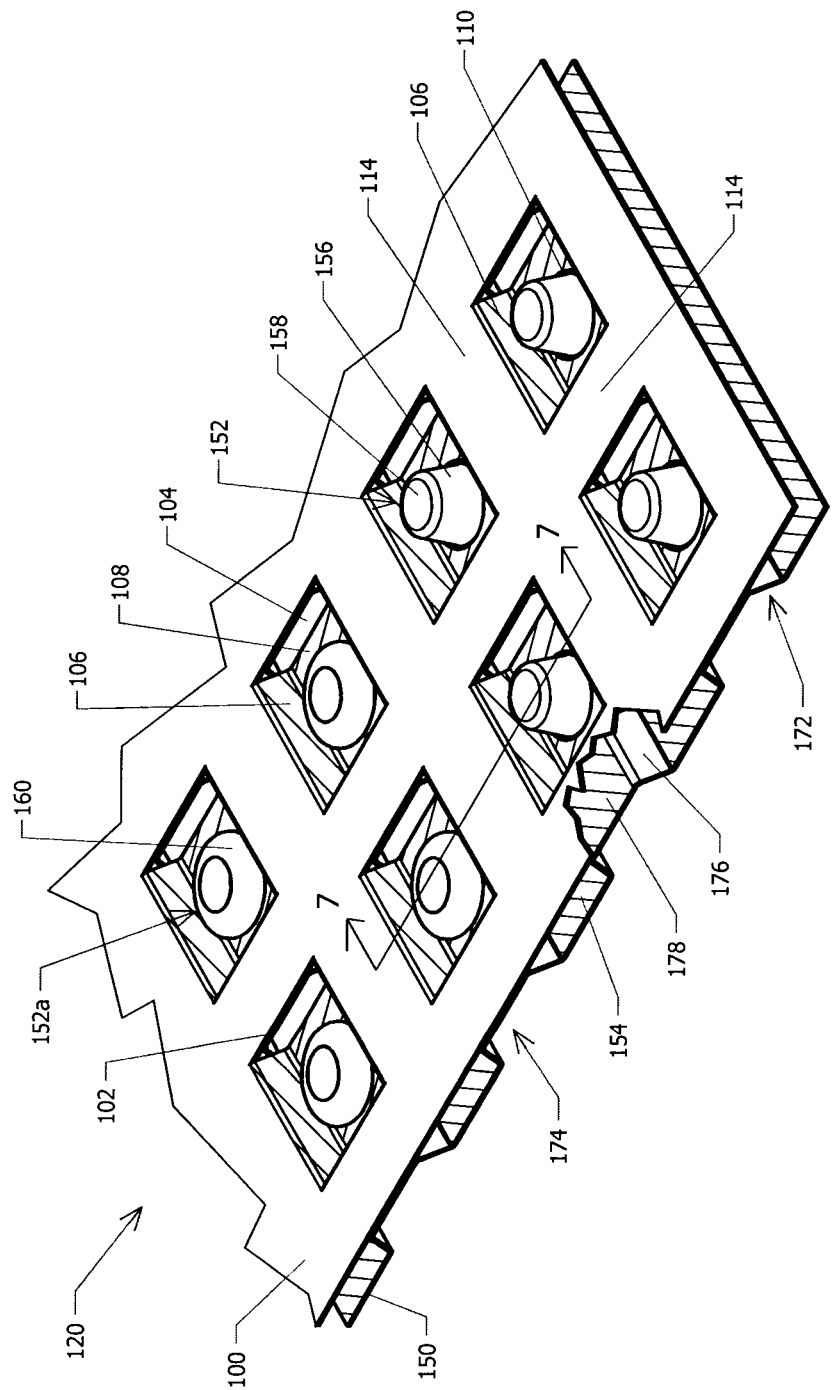
FIG. 6 is a perspective view of the layers of FIGS. 4 and 5 interconnected to form the first embodiment of a nonwoven industrial fabric.
Figure 7:
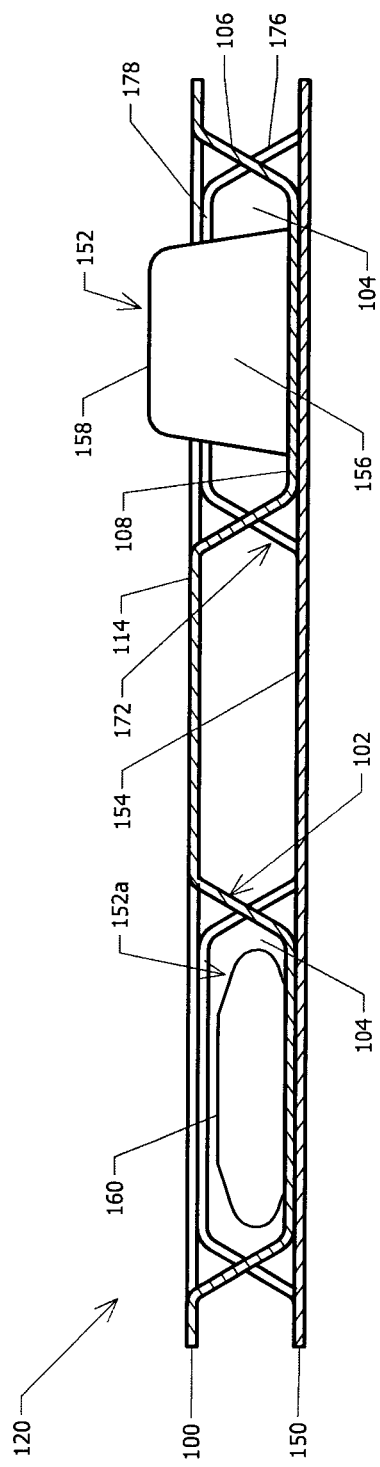
FIG. 7 is a side view of the nonwoven industrial fabric of FIG. 6.

FIG. 5 is a perspective view of a portion of one surface of a second profiled layer 150 including securing protrusions 152, 152*a* each separated from the next by planar land areas 154. As shown, securing protrusions 152 are generally conical or frustoconical including side walls 156 terminating at generally planar top 158; securing protrusions 152 may be provided with cross-sectional shapes other than generally circular, such as oval, rectangular, elliptical, helical or square, and may take the form of a pyramid, cone or other shape. Securing protrusions 152 are dimensioned, shaped and positioned so as to be insertable into and matable with detent openings 112 of first film layer 100 as illustrated in FIGS. 6 and 7. Layer 150 further includes profiling protrusions 172, each of which include planar side walls 176 and a top surface 178. Profiling protrusions form flow-through apertures 174 which are structured and arranged for alignment with flow-through apertures 104 in the assembled structure 120 (shown in FIG. 6) and provide flow-through venting of fluids from layer 100, and additional support between the two layers 100, 150 in order to maintain an interior void volume between the layers. As shown in FIG. 5, a portion of the securing protrusions 152 are deformed in a suitable forming process to provide securing protrusions 152*a* including mushroom-shaped heads 160 as described below.

FIG. 6 is a perspective view of a mechanically interlocked nonwoven industrial fabric 120 constructed from layers 100 and 150 (shown in FIGS. 4 and 5, respectively). As shown at the right of FIG. 6, four securing protrusions 152 from layer 150 are positioned in each of four detent openings 112 including detents 100 of layer 100. The securing protrusions 152 are subjected to a forming process, such as hot staking, which results in the compression of the securing protrusions resulting in the shape presented as 152*a* including head 160. If the layers 100, 150 are formed of a plastic material, heat can be provided to soften the material. The combination of applied heat and pressure causes the top surface 158 and a portion of the side wall 156 of the securing protrusion 152 to deform, thus providing a head 160 that secures each securing protrusion. Head 160 serves as a locking mechanism to hold securing protrusions 152*a* in place in cooperation with detent 110 in layer 100 thus forming a "locking pair". Top surfaces 178 of profiling protrusions 172 in layer 150 are in contact with the lower surfaces of land areas 114 in layer 100. Side walls 176 support top surfaces 178 and assist in allowing the assembled fabric 120 to resist compressive loading. Profiling protrusions 172 also provide flow-through apertures 174, which when aligned with flow-through apertures 104 cooperate to provide open flow channels through assembled fabric 120. Land areas 114 rest upon top surfaces 178.

The nonwoven industrial fabric 120 is firmly locked in this arrangement by heads 160 which are lockably retained by detents 110 as a locking pair. The underside of land areas 154 in layer 150 provides a planar surface of the assembly 120 which, when in use, may provide the running (machine side) surface of the industrial fabric. Land areas 114 in 100, together with upper surfaces 108 and heads 160 may be used as a product conveying surface.

FIG. 7 is a cross-sectional view of a portion of the mechanically interlocked nonwoven industrial fabric 120 shown in FIG. 6. At the right, securing protrusion 152 is shown prior to the application of a thermoforming process (such as hot staking). Following thermoforming results in securing protrusion 152*a* (at left), which includes head 160 which serves to mechanically lock second film layer 150 in position adjacent to first film layer 100 by means of detent 110 as shown in FIG. 4. A hot staking process can be used for providing the head 160 in securing protrusions 152*a*.

By mechanically interlocking the two layers 100, 150 in this manner, it is now possible to use differing materials for each of the layers. For example, film layer 100 may be located in the product conveying position and may not be in direct contact with either heat or abrasive wear. It could therefore be made from a thermoplastic material such as a polyester (e.g. PET), a polyamide (e.g. Nylon™ 6) or a similar polymeric material as would be commonly used in industrial fabrics. On the other hand, land areas 154 are often in contact with devices, such as heated rolls or scraping units. Therefore, 150 can be made from a robust material, such as a polyimide film, or even a metal sheet. As discussed above, such dissimilar materials are not conducive to TTLW or similar bonding means that would be used to assemble the prior art fabrics shown in FIGS. 1 through 3.

It will be appreciated that further modifications of the assembled nonwoven industrial fabric 120 are now possible. For example, either one or both exterior surfaces and land areas 114 and 154 can be treated to provide a micro-scale surface structure (or roughness) embodied as grooves, striations, cross hatchings, pebbles, stipples or other similar forms of surface irregularities that are comparatively small in relation to the profiling protrusions and flow-through apertures. Such surface treatment provides a measure of contamination resistance to each layer. The physical treatment can be provided at any suitable stage of fabric assembly. For example, it can be performed while the layers (e.g. 100, 150) are still planar (i.e. before land areas, depressions, detents and protrusions are formed). Micro-scale surface structures can be made by various methods, including mechanical embossing, chemical etching, plasma or laser etching; other treatments may prove suitable. The surface treatment may be applied to at least a portion of one or both exterior surfaces of the assembled textile. The averaged surface roughness resulting from the surface treatment can be from at least about 1 μm to about 100 μm. The surface roughness is determined using standard procedures, described, for example, in DIN EN ISO 4287 "Geometrical Product Specifications (GPS)—Surface texture: Profile method—Terms, definitions and surface texture parameters".

It would of course be possible to apply other suitable surface treatments to at least one layer of the industrial fabric, depending on its intended end use. For example, a thin layer of a metal material (e.g. aluminum, nickel or chromium) can be applied by vapor deposition to layers formed from a thermoplastic material, such as PET, polypropylene, or nylon may provide benefits for static charge dissipation. Chemical treatments may also be applied to improve contamination resistance, increase frictional characteristics, or other properties as deemed necessary or desirable. A nanoparticle surface treatment (e.g. see U.S. Pat. No. 7,811,627) may also be applied to improve contamination resistance; a plasma treatment may optionally be used on the surface to functionalize and improve adhesion of nanoparticle material. A surface coating of urethane, in particular urethane latex, may be added to increase frictional characteristics (e.g.: "grip") when the textile is used in a dry forming or conveying application (similar to the metallization).

In addition, bonding methods can be used to further secure the layers together. Suitable bonding methods include, for example, laser or ultrasonic welding, adhesives, or other chemically-reactive systems, depending on the material composition of the layers.

Summary of Second, Third and Fourth Embodiments

FIGS. 8 to 16 show mechanically interlocked film and sheet fabrics according to further embodiments in which the mechanical interlocking means are provided in land areas between the protrusions. In these embodiments, the selectively apertured and profiled pattern of the fabric or fabric layer facing the product is configured according to a first arrangement, while the layer on the opposite surface is provided with a second pattern different from the first, and the two layers are mechanically interlocked using a third pattern of protrusions and detent openings which are positioned to be in between the first and second patterns.

In the embodiments shown in FIGS. 4 through 16, only two layers of film or sheet material are provided. However, it is within the scope of the invention to add an additional layer of material to the upper and/or lower surface and to mechanically interlock the additional layer in the manner described above.

Figure 17:
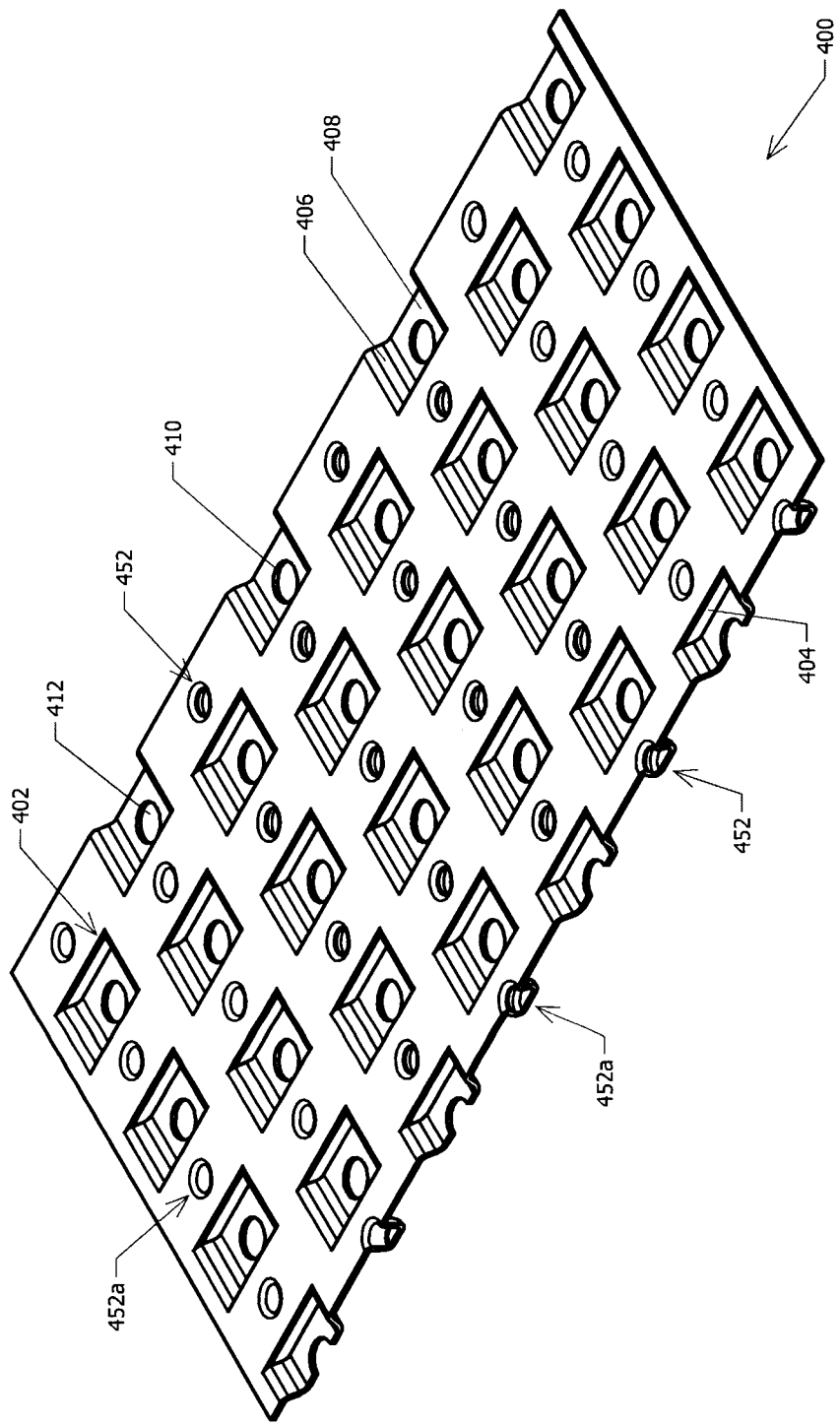
FIG. 17 illustrates a fourth embodiment of a sheet prior to assembly of a nonwoven fabric according to a fourth embodiment.
Figure 18:
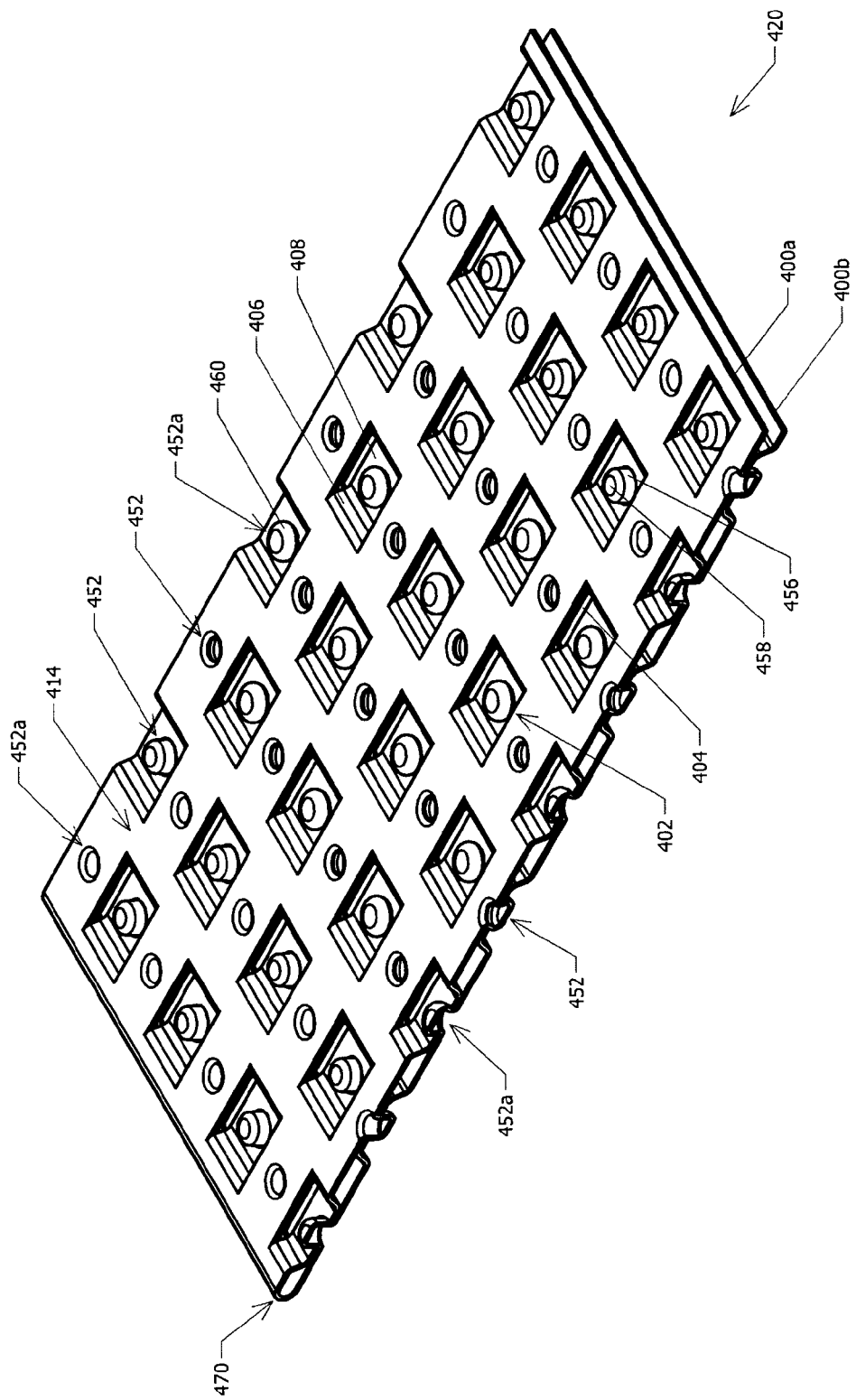
FIG. 18 illustrates a portion of a nonwoven industrial fabric constructed from the sheet shown in FIG. 17.

FIGS. 17 and 18 illustrate an embodiment where each layer has a both securing protrusions and detents. In addition, each layer may be formed from its own sheet, or both layers may be formed from a single sheet.

Second Embodiment

Figure 8:
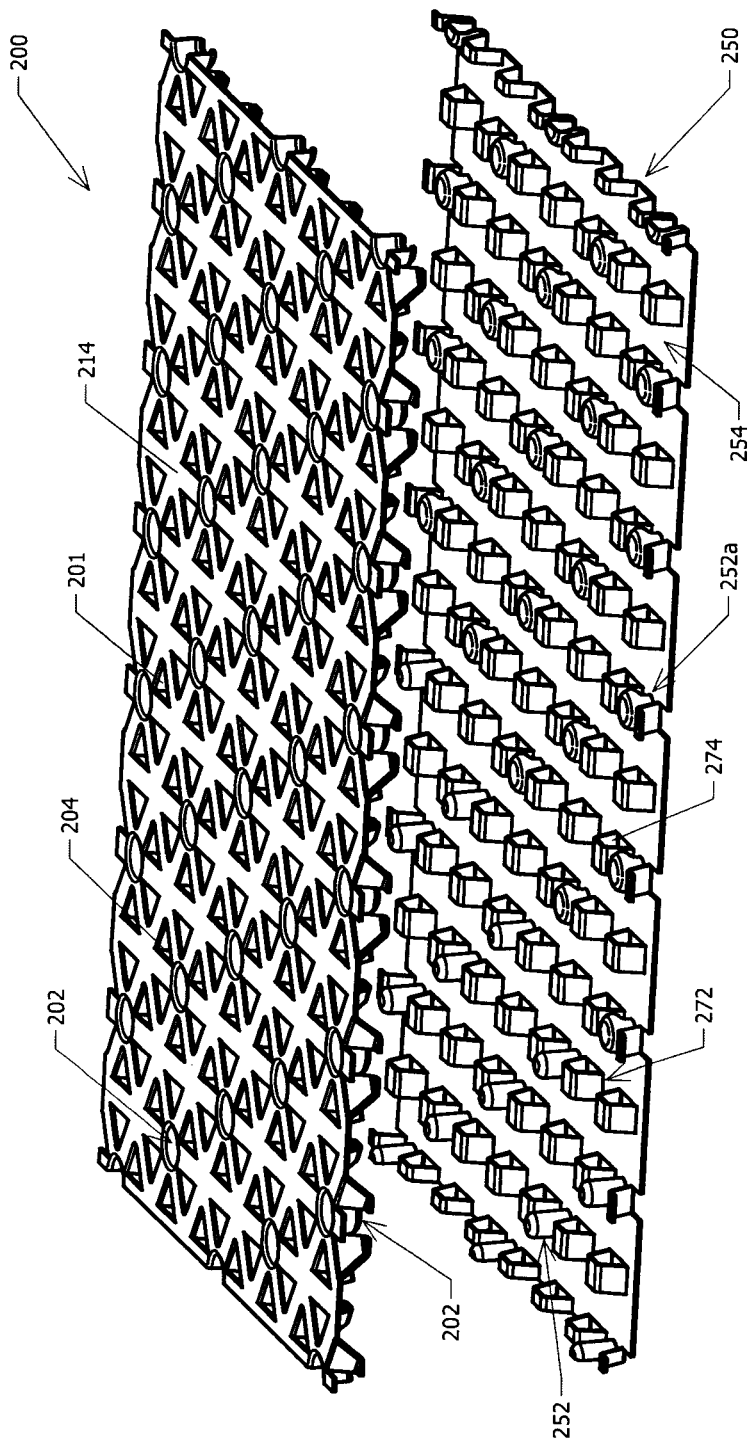
FIG. 8 is an exploded view of a nonwoven industrial fabric according to a second embodiment.

FIG. 8 is an exploded view of a nonwoven industrial fabric according to a second embodiment. The two layers (200, 250), normally joined together to make the nonwoven industrial fabric, are separated in this view in order to better view the topography of the surface of each layer. The stakes/securing protrusions 252*a* at right side of the figure have been compressed by a hot staking process from their original form 252 at the left of the figure.

The fabric 220 (shown in FIG. 9) includes layer 200 connected to second layer 250. Layer 200 includes a plurality of profiling protrusions 201 which, in this embodiment, are generally triangular. These profiling protrusions (201) are separated by coplanar surface structure land areas 214 that provide the layer 200 with a particular surface pattern. Although the profiling protrusions 201 are triangular in shape in this embodiment, with surface structure areas 214 located there between to provide a particular surface pattern, it will be appreciated that other shapes may be possible. Each profiling protrusions 201 also includes at least one flow-through aperture 204 which provides a flow-through opening for movement of fluid from layer 200 through the fabric 220 when aligned with a corresponding flow-through aperture in the second layer 250 of the fabric 220.

Figure 10:
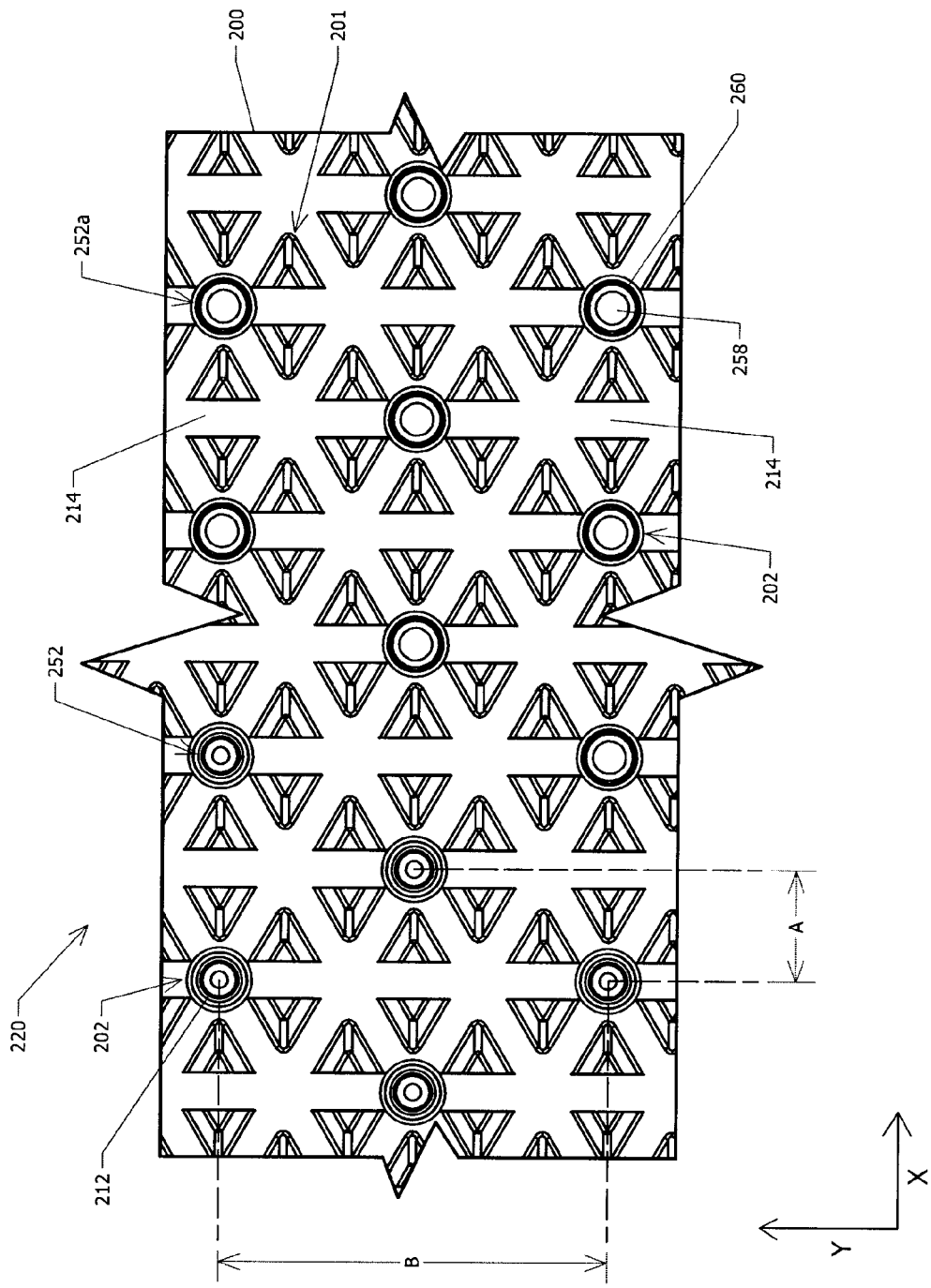
FIG. 10 is a top view of the nonwoven industrial fabric of FIG. 9.

Layer 200 further includes cup-shaped depressions 202, each of which is oriented "downwards" in the assembly towards layer 250. Each depression 202 includes continuous side walls 206 that form the boundary of the depression, and a "bottom" 208 that includes detent opening 212 and detent 210. As shown in FIG. 10, depressions 202 are regularly arranged along surface structure land areas 214 so that each depression is separated from the next by a distance B in the Y-direction. Each land area 214 is separated in the X-direction from an adjacent land area 214 by distance A.

Figure 9:
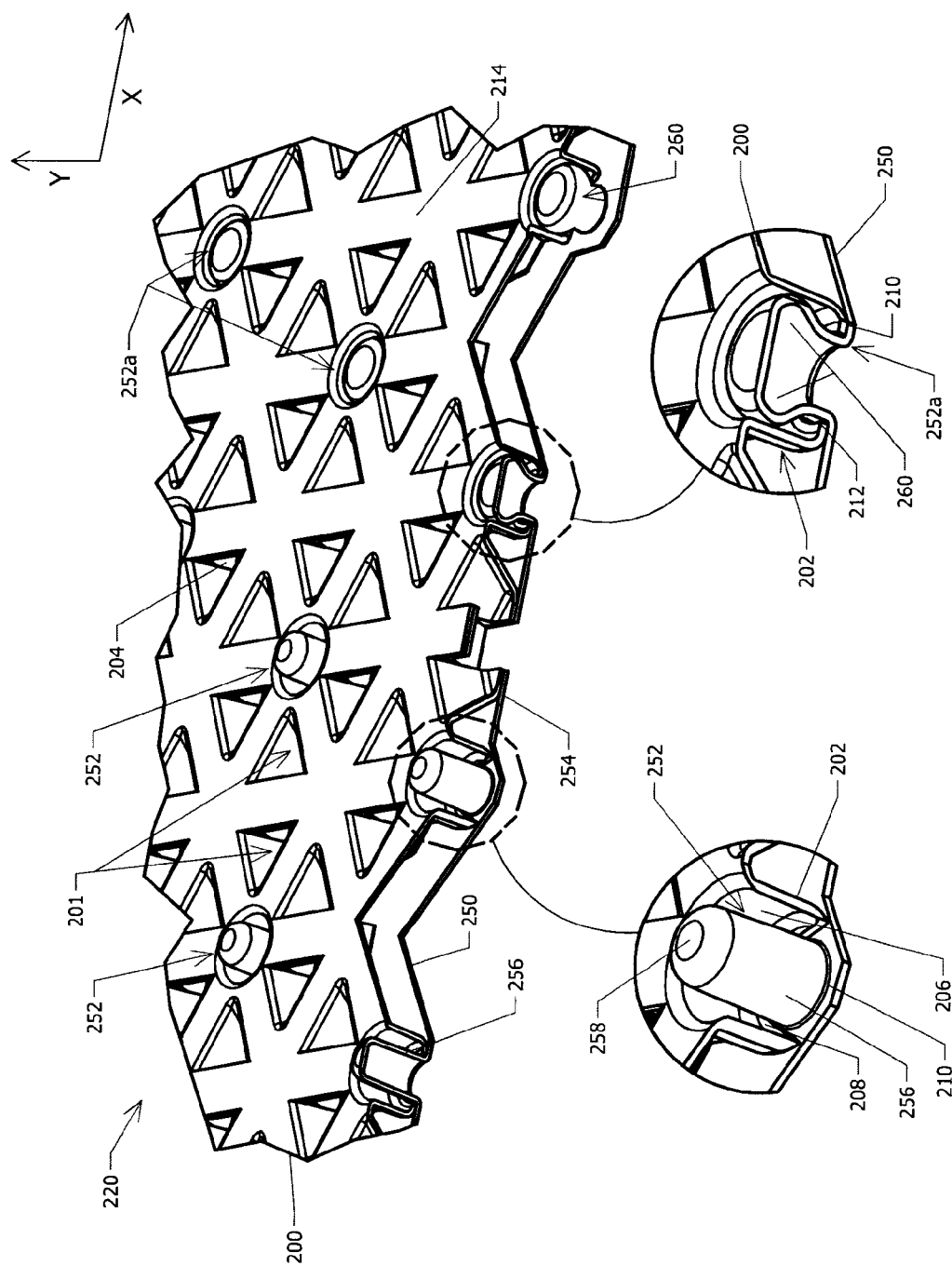
FIG. 9 is a perspective view of the nonwoven industrial fabric of FIG. 8.
Figure 11:
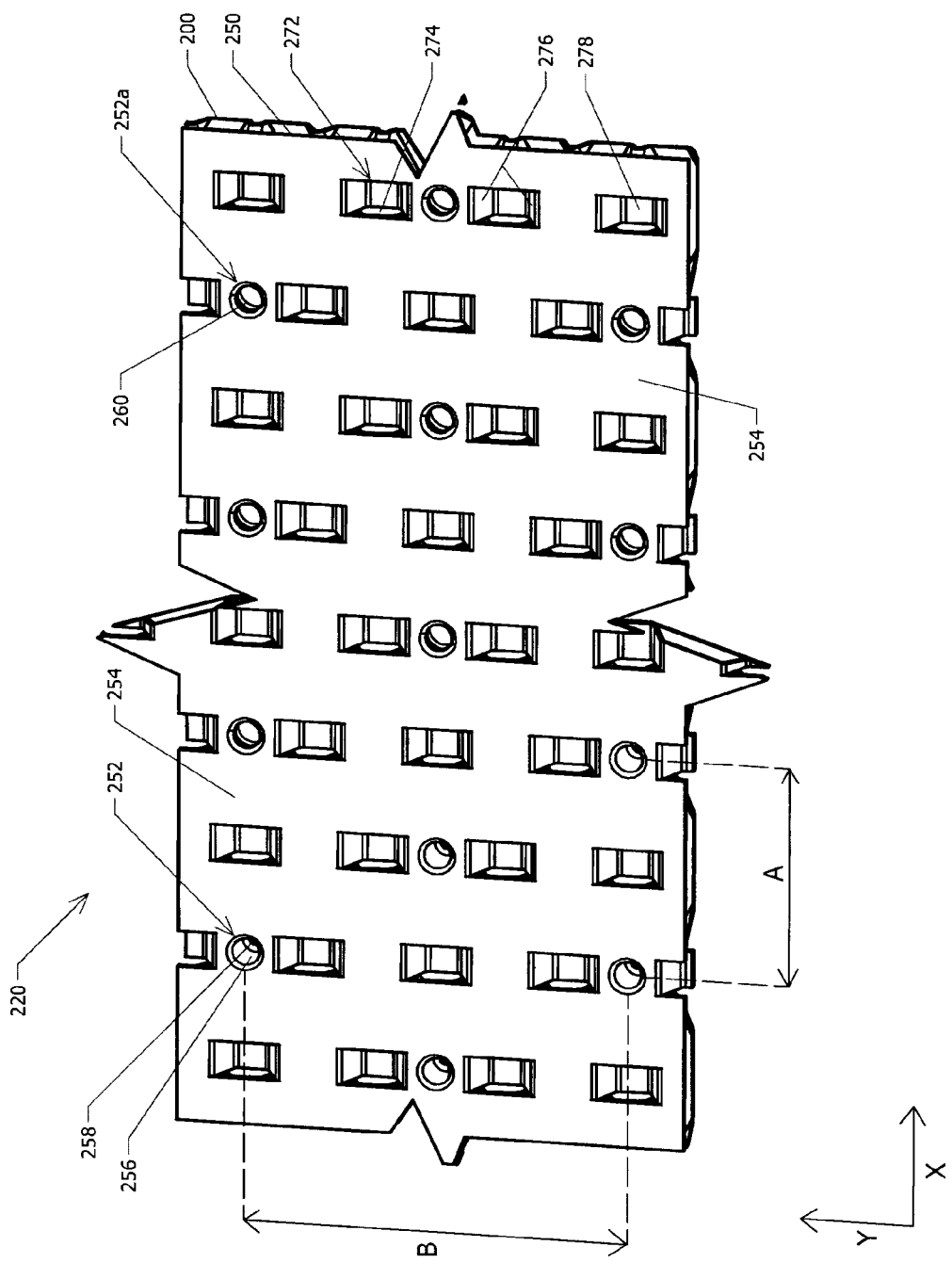
FIG. 11 is a bottom view of the nonwoven industrial fabric of FIG. 10.

As shown in FIGS. 9 through 11, layer 250 is mechanically interlocked with layer 200 by a plurality of securing protrusions 252*a*. A few of these are shown following a thermoforming process (such as hot staking) such that the securing protrusion includes a head 260. Securing protrusions 252 are initially (before hot staking) generally cylindrically shaped and include continuous cylindrical side wall 256 surmounted by closed top surface 258. Each of the securing protrusions 252 is arranged in regularly spaced linear rows whose spacing corresponds to that of depressions 202 in layer 200. In this manner, each securing protrusion 252 may be located in detent openings 212 of depressions 202 when the fabric 220 is assembled. Each securing protrusion 252 is separated from an adjacent securing protrusion 252 in the Y direction by distance B and in the X direction by distance A. Securing protrusions 252 are dimensioned, shaped and positioned on layer 250 so as to be lockable with corresponding detents 210 in layer 200, when suitably deformed.

When layers 200 and 250 are brought into engagement, securing protrusions 252 are inserted into detent openings 212 of depressions 202. Securing protrusions 252 are then deformed by means of a hot staking process, whereby part of the continuous cylindrical side wall 256 and closed top surface 258 are heated and compressed to form head 260. Head 260 forms a mechanical interlock with depression 202 due to detent 210 in detent opening 212, thus securing the layers 200 and 250 together to provide the fabric 220 (see detail in FIG. 9).

FIG. 10 is a plan view of layer 200 assembled with layer 250 (not shown) in fabric 220. Layer 200 is profiled to provide triangularly-shaped profiling protrusions 201 separated by surface structure land areas 214. Top surfaces 258 of securing protrusions 252 which have not been deformed are shown at the left of FIG. 10. Heads 260 of deformed securing protrusions 252*a* are shown at right. As discussed above, securing protrusions 252 and 252*a* (following deformation to provide heads 260) are located in detent openings 212 of depressions 202 and are regularly arranged in each of the X- and Y-directions so as to be matable with depressions 202. Heads 260 are retained in depressions 202 by detents 210 in layer 200 (see enlarged areas of FIG. 9).

FIG. 11 is a plan view of layer 250 as assembled together with layer 200 in fabric 220. The surface appearance of layer 250 differs from that of layer 200 shown in FIG. 10, and includes securing protrusions 252, which in turn, include continuous side walls 256 and tops 258. A few of the securing protrusions are shown as deformed to provide heads 260 on securing protrusions 252a. Layer 250 further includes profiling protrusions 272 arranged in rows, with flow-through apertures 274 in fluid communication with flow-through apertures 204 (see FIG. 9) in layer 200. Each profiling protrusion 272 includes a pair of planar side walls 276 that are angularly oriented towards a top surface 278. Profiling protrusions 272 are located in layer 250 so that their flow-through apertures fit beneath land areas 214 in layer 200. Furthermore, flow-through apertures 274 in profiling protrusions 272 are matable with corresponding flow-through apertures 204 in layer 200. Profiling protrusions 272 thus provide venting of fluids through the fabric 220, and additional support between the two layers 200 and 250 to assist in maintaining a void volume between the layers (which void volume is also maintained by profiling protrusions 201 in layer 200). In this embodiment, securing protrusions 252, 252a are located in the same rows as the profiling protrusions 272, with three profiling protrusions 272 separating each securing protrusion 252a. In this manner, securing protrusions 252, 252a are separated in the Y direction by distance B and in the X direction by distance A such as to be alignable and matable with corresponding depressions 202.

It can be seen from FIGS. 9 to 11 that the fabric 220 provides a first surface profile based on the shape and arrangement of the profiling protrusions 201, the surface structure land areas 214 and depressions 202 (including heads 260 of securing protrusions 252a) in the surface of layer 200. Furthermore, flow-through apertures 204 in profiling protrusions 201 of layer 200 are in communication with corresponding flow-through apertures 274 in second layer 250. The mechanical interlocking between the layers 200 and 250 is provided by detents 210 located in detent openings 212 which are integral portions of each depression 202 of layer 200. Securing protrusions 252, which are integral portions of layer 250, are positioned such that they engage detent openings 212 in layer 200. The mechanical interlock is formed by deforming securing protrusions 252 such that each forms a head 260 which, by virtue of detent 210, lockably engages the protrusions 202 and 252a securely together. When in use, the industrial fabric 220 will usually be oriented such that the indicated Y-direction is parallel to the intended machine direction.

Assembly of Two Layers of a Nonwoven Fabric by Use of Hot Staking

As described above, "hot staking" refers to a process of forming a mechanical interconnection between one or more objects whereby one of the objects is provided with detent openings which are matched up with stakes (or deformations) whose outer perimeter approximates, but is smaller than, that of the detent opening protruding from a second object. The objects are aligned such that the stakes on one object penetrate the detent openings in the second object and protrude there through. The upper portion of the stake is then deformed by mechanical and optionally thermal means so that its perimeter is greater than the detent opening through which the stake has initially passed. In hot staking, the securing protrusion (i.e. the stake) is an integral portion of the first object and is lockably engaged with at least one detent (i.e. the perimeter of the detent opening) integral to the second object.

In the embodiment shown in FIGS. 4 to 11, at least two layers are interconnected using hot staking.

The process for hot staking in the above embodiments may be described as follows:

a) Two layers of a selected precursor fabric material, such as plastic film or thin metal sheeting, are brought together.

b) Each of the layers is separately profiled with a particular pattern of depressions, land areas and flow-through apertures; the patterns on the two layers may be identical or different.

c) In addition, one layer has a plurality of securing protrusions or stakes, while the other layer has a plurality of detents. Each detent form the perimeter of a detent opening through which a corresponding stake is inserted. That is, the stakes of one layer are inserted into the detents of the other layer d) A compression head (which may be heated) is brought into alignment with each stake and the head then presses and optionally heats the protruding end of the stake to produce an enlarged head at that end, which mechanically interlocks the two layers together.

Third Embodiment

Figure 12:
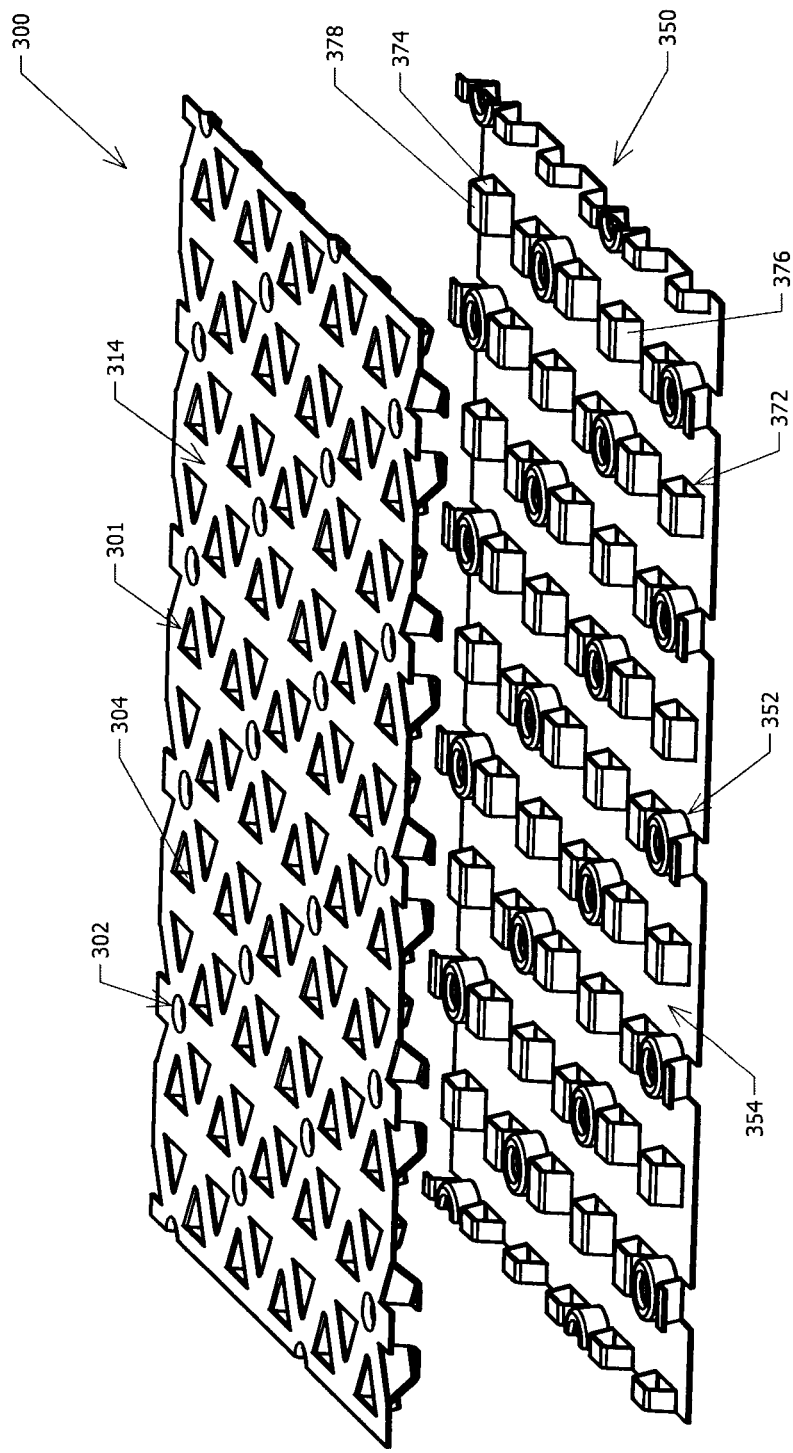
FIG. 12 is an exploded view of a nonwoven industrial fabric according to a third embodiment.

FIG. 12 is an exploded view of a nonwoven industrial fabric according to a third embodiment. The two layers (300, 350), normally joined together to make the nonwoven industrial fabric, are separated in this view in order to better view the topography of the surface of each layer.

Figure 13:
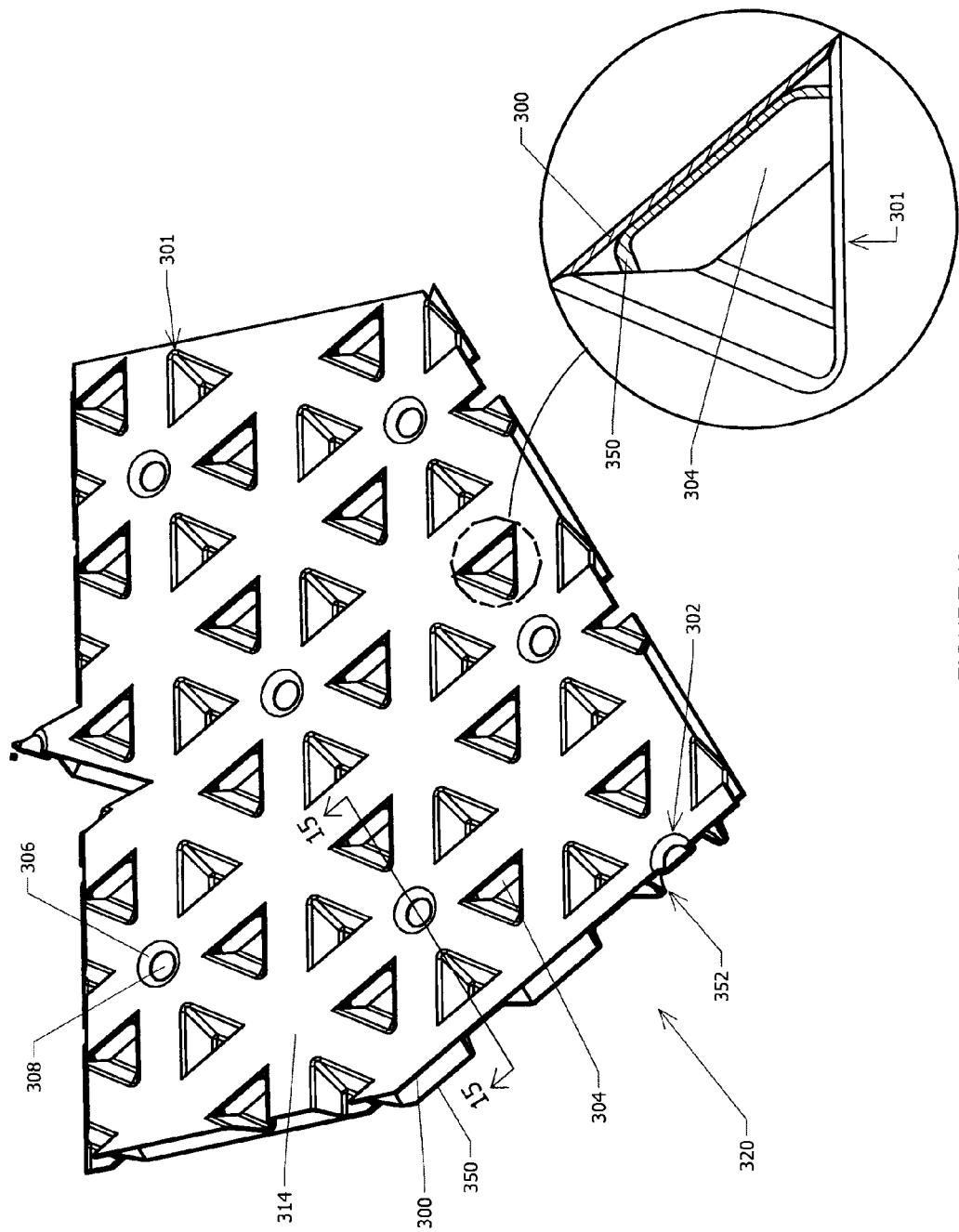
FIG. 13 is a perspective view of the nonwoven industrial fabric of FIG. 12.
Figure 14:
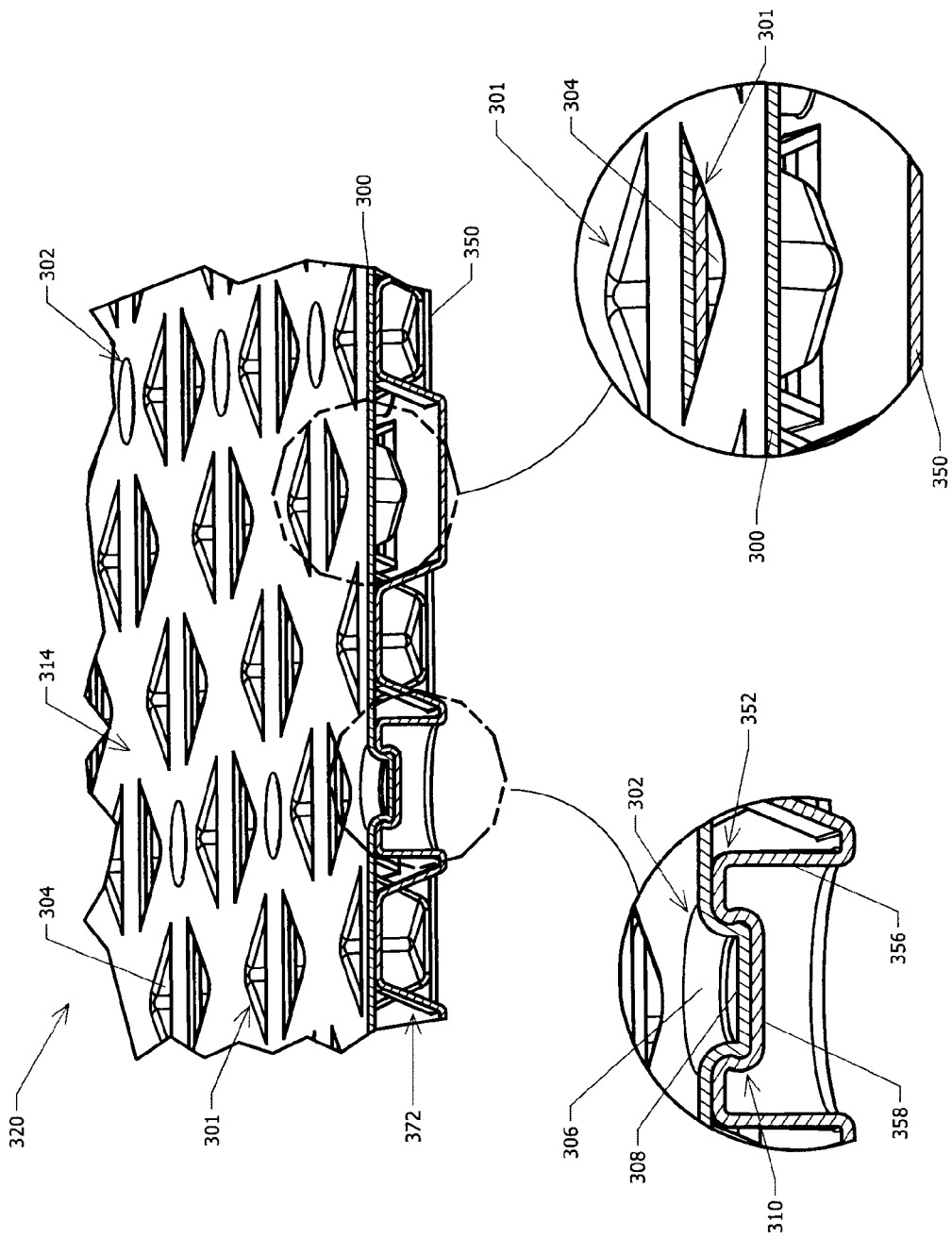
FIG. 14 is a side perspective view of a portion of an edge of the nonwoven industrial fabric of FIG. 13.

FIG. 13 is a perspective edge view of the nonwoven industrial fabric 320 shown in FIG. 12. FIG. 14 illustrates an enlarged perspective view of one of the "locking pairs" of securing protrusions 302 and detents 310. Detents 310 are located within detent regions 352 shown in FIG. 13.

In FIG. 13, the fabric 320 includes layer 300 mechanically connected to layer 350. Layer 300 is profiled with a plurality of profiling protrusions 301, each of which is separated from an adjacent profiling protrusion by surface structure land areas 314 arranged in the manner analogous to that described in FIGS. 8 to 11. Each profiling protrusions 301 also includes at least one flow-through aperture 304 for flow-through venting of fluid from layer 300 through layer 350 (see enlarged area at lower right of FIG. 13). Layer 300 further includes cup-shaped securing protrusions 302, each of which is oriented towards layer 350 in the assembly. Securing protrusions 302 include a generally planar surface 308 and each securing protrusion 302 is separated from adjacent securing protrusions 302 by land areas 314.

FIG. 14 shows in greater detail the triangular-shaped profiling protrusions 301 in layer 300, the surface structure land areas 314 there between, the flow-through apertures 304 in the profiling protrusions 301, and the side walls 306 and land areas 314 between the securing protrusions 302 in the surface of layer 300.

Layer 350 is mechanically interlocked with layer 300 by means of a clinching process which simultaneously forms and interlocks securing protrusion 302 with detent 310 in detent region 352 to provide a form and force fitted joint between the two protrusions. That is, prior to the final assembled form shown in FIGS. 12-16, two profiled layers are brought together. The profiling pattern on each layer may be identical or different. The profiled layers initially do not have any securing protrusions, detents or detent regions, as these are formed simultaneously during the clinching process. The two profiled layers then undergo a series of clinching procedures, such that a plurality of locking pairs are formed, in which securing protrusions (on one layer) and detents (on the other layer) are simultaneously formed and interlocked.

Figure 15:
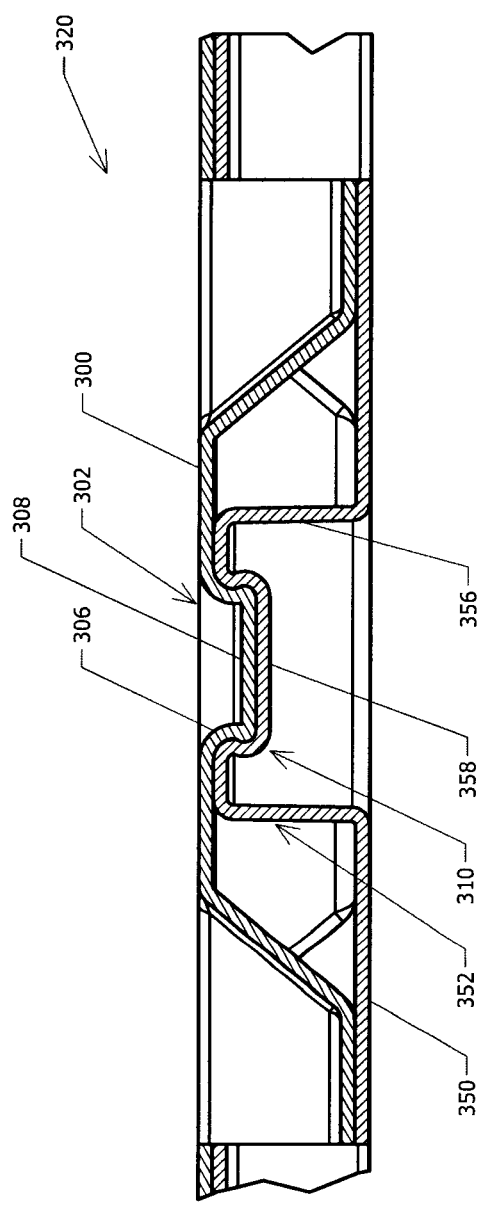
FIG. 15 is a side view of the nonwoven industrial fabric of FIGS. 13 and 14.

As seen in the enlarged area at left of FIG. 14 and in FIG. 15, side wall 306 of securing protrusion 302 together with side wall 356 of detent region 352 are constricted together and both sheet materials are forced radially outwards to provide detent 310 which lockably engages side walls 306 and 356 in the manner shown, so that side wall 306 and side wall 356 are nested together and constricted at the perimeter of detent 310. In this manner, the securing protrusion 302 cannot separate from the detent 310 and detent region 352 without applying considerable force. When interlocked, planar surface 308 of securing protrusion 302 sits adjacent planar surface 358 of detent region 352. The clinching process is applied to selected locations in the aligned layers to provide pairs of clinched securing protrusions/detents throughout the fabric.

Figure 16:
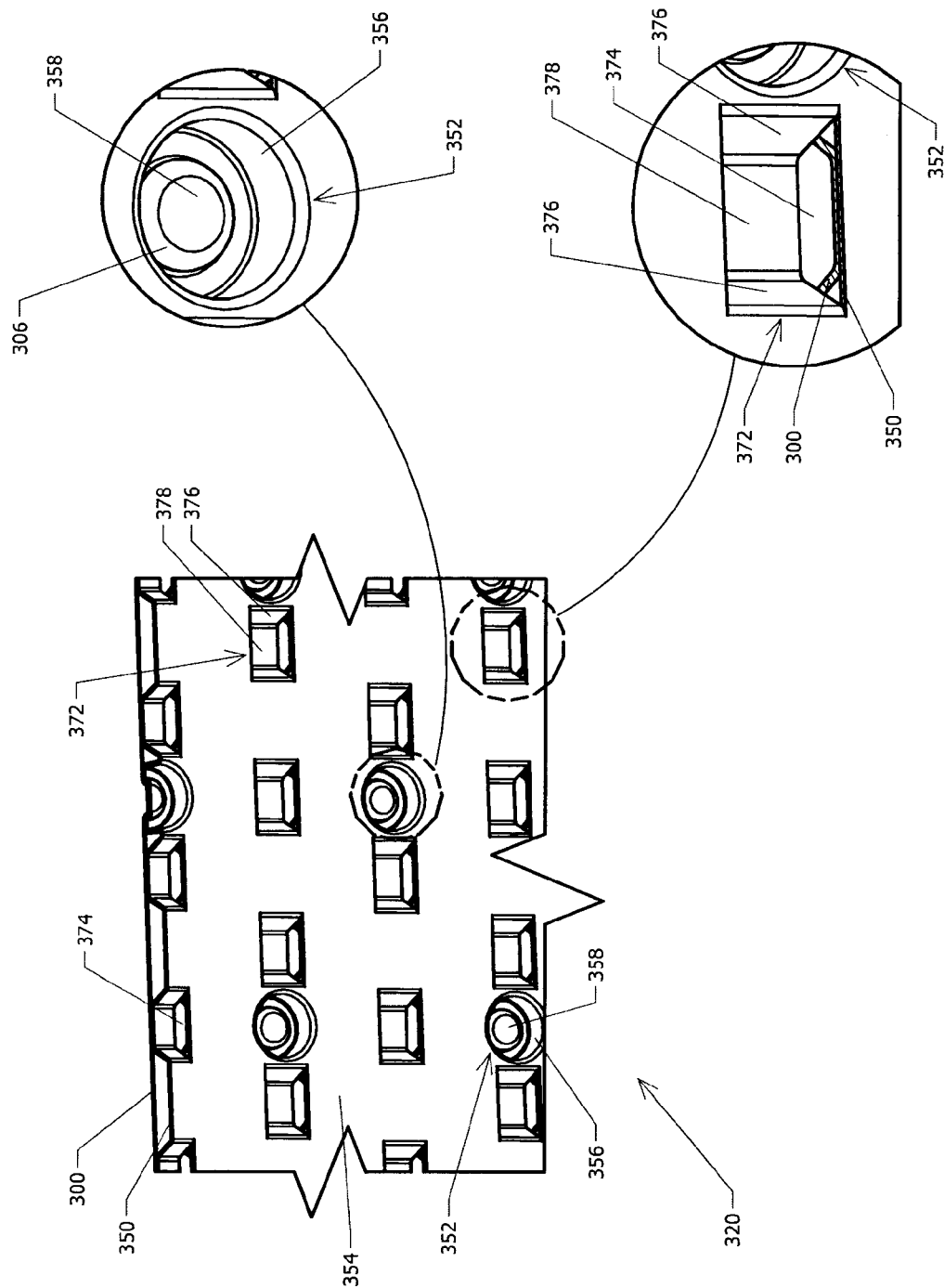
FIG. 16 is a bottom perspective view of the industrial fabric of FIGS. 13 to 15.

FIG. 16 is a bottom perspective view of layer 350 in the nonwoven industrial fabric 320 shown in FIGS. 12 to 15. In this view, the cut and exposed edge of the fabric 320 is provided at the top of FIG. 16. Layer 350 is provided with a plurality of flow-through apertures 374 located beneath profiling protrusions 372. Each third profiling 372 includes a pair of side walls 376 and generally planar surface 378. Each detent region 352 is separated from an adjacent detent region 352 by land areas 354 and each is regularly arranged on the layer 350 in a manner coinciding with the arrangement of securing protrusions 302 on layer 300.

Assembly of Two Layers of a Nonwoven Fabric by Use of Clinch Joints

As described above, a "clinch joint" refers to a mechanically interlocked form and force fitted joint that is formed under pressure between two material layers by plastically deforming both layers simultaneously such that a portion of one layer is interior to the other layer at the deformation and is retained by a "clinch"—a restriction in the deformation of the outermost of the two layers which creates a detent. No additional components are required to complete the joint. In the embodiment shown in FIGS. 12 to 16, two layers are interconnected using clinch joints.

The process for forming clinch joints in the above embodiment may be described as follows:

a) Two layers of a selected precursor fabric material, such as plastic film or thin metal sheeting, are brought together.

b) Each of the layers is separately profiled with a particular pattern; the patterns on the two layers may be identical or different.

c) The two superimposed layers are brought through a pair of embossed nip rolls or a press which includes a plurality of die and punch embossments which deform selected portions of both layers by application of pressure (and optionally heat).

d) The punch may, for example, form a plurality of cup-like depressions in both layers around which the die forms a pinch, constricting the outer of the two surfaces to form a detent, which mechanically engages the two deformations. The clinching process is complete.

Assembly of a Nonwoven Fabric

A nonwoven mechanically interlocked fabric can be assembled by overlapping two layers in either a partial overlap ("lap join") or full overlap of the layers.

For example, in a spiral winding process, successive turns of a sheet of the first layer are spirally wound in abutting relation. Similarly, a sheet of the second layer is wound over top in a similar spiral manner such that each strip of the second layer overlays where two first layer strips are abutted along their longitudinal side lengths. This process builds an endless sock or tube of the required width and length in which the two layers are mated. Furthermore, each strip of the second layer partially overlaps every two strips of the first layers in a series of lap joins, and vice-versa. The spiral winding process for assembly of industrial fabrics is known and disclosed in U.S. Pat. Nos. 5,268,076; 5,360,656; and 5,785,81, for example. In this process, the material strips are oriented in the longitudinal direction of the assembled textile, or at a small angle thereto.

Another way of assembling an industrial fabric from two or more layers is to use a successive insertion process. In this process, successive strips of a first layer of material are laid down in abutting relation along their longitudinal lengths; each strip is cut to a length approximately equal to the desired width of the completed fabric. Successive strips of a second layer are then laid over the material strips of the first layer. The second material strips may be oriented parallel or perpendicular to the first material strips. If oriented parallel, then each second layer strip straddles and covers the abutting longitudinal edges of every two first layer strips so as to form a lap join and partially cover a portion of each of the two strips. If oriented perpendicular, then each second material strip is cut to the desired final length of the finished fabric. A plurality of these second material strips are laid in abutting relation over a plurality of first material strips which are also laid in abutting relation.

Fourth Embodiment

FIG. 17 is a perspective view of a profiled layer 400 for use the assembly of a nonwoven assembly according to a fourth embodiment. Unlike the layers described in previous embodiments, layer 400 includes both components of a locking pair (i.e. both securing protrusions and detents). As such, layer 400 may be mechanically joined either to itself, or to a second, similarly profiled layer 400. In either case, the final assembly is shown in FIG. 18.

Layer 400 includes profiling protrusions 402 and flow-through apertures 404. The profiling protrusions 402 are regularly arranged with planar land areas 414 between each profiling protrusion 402. Planar surface 408 of each profiling protrusion 402 is provided with a detent opening 412, defined by the edge of detent 410 and supported by side walls 406. Detent opening 412, which is shown here as being generally circular in shape, may have any shape so long as it accommodates and mates with a securing protrusion 452 that are arranged on planar land areas 414 between profiling protrusions 402. In addition, the securing protrusions 452 are arranged in order to protrude into detent openings 412. A locking pair is formed between a protrusion 452 and detent 410 once protrusion 452 is deformed to form protrusion 452a. Deformation can be achieved by a hot staking process, for example. Land areas 414 may be of any size or shape, provided that profiling protrusions 402 and detent openings 412 can be located so as to be mated with securing protrusions 452 in either the same layer 400, or a separate layer as described below. As shown in both FIGS. 17 and 18, a portion of the securing protrusions 452 are deformed in a suitable forming process to provide securing protrusions 452a including mushroom-shaped heads 460 as described below.

As seen in FIGS. 17 and 18, profiling protrusions 402 also include flow-through apertures 404 which are structured and arranged so as to be alignable with the same or similar flow-through apertures 404 in the assembled structure 420 (shown in FIG. 18). Apertures 404 provide flow through venting of fluids from first layer 400a, through the assembled fabric 420 and out through second layer 400b (FIG. 18), and additional support between the aligned two layers 400a, 400b in order to maintain an interior void volume between the layers.

FIG. 18 is a perspective view of a portion of a nonwoven industrial fabric 420 constructed from two identical layers 400a, 400b of layer 400 shown in FIG. 17. Layers 400a, 400b are provided by folding layer 400 along fold line 470 (shown at upper left of FIG. 18) so that the securing protrusions 452 are mated with detent openings 412 (see FIG. 17) including detents 410. As shown in FIG. 18, only a portion of the securing protrusions 452 have been subjected to a deformation process (e.g. hot staking) which results in protrusion 452a, including head 460. If the layer or layers 400a, 400b are formed of a plastic material, heat can be provided to soften the material and assist the deformation. Heads 460 serve as a locking mechanism to hold securing protrusions 452a in cooperation with detent 410 in both layers 400a, 400b, thus forming a "locking pair".

Note that planar surfaces 408 of profiling protrusions 402 in each layer 400a, 400b are in contact with the lower surfaces of land areas 414 in each layer. Side walls 406 support planar surfaces 408 and assist in allowing the assembled fabric 420 to resist compressive loading. Profiling protrusions 402 also provide flow-through apertures 404, which when aligned with corresponding flow-through apertures 404 in each layer 400a, 400b cooperate to provide open flow channels through assembled fabric 420. Land areas 414 rest upon top surfaces 408.

The land areas 414, planar surfaces 408 and heads 460 in layers 400a, 400b provide outside surfaces of the assembly 420 which, when in use, may be oriented as the running (machine side) surface or the product conveying surface of the industrial fabric.

The presence of securing protrusions and detents in both layers allows for many other ways of assembling two layers together. For example, while FIG. 18 illustrates the overlap of two layers 400a, 400b constructed from one sheet 400 (see FIG. 17), two distinct sheets, each with its own set of detents and securing protrusions, can be mated to provide secured layers analogous to that shown in FIG. 18, without the presence of fold line 470.

Clinching can also be used to form a nonwoven fabric with detents and securing protrusions on both layers. Where a single sheet is folded over to provide the two layers (analogous to FIG. 18), the process is generally as follows: the single sheet initially comprises profiling protrusions and flow-through apertures. It is then folded over so that two layers are brought together. The clinching process is applied a first time to the two layers, so that securing protrusions are created on the first layer, and detents are created on the second layer. The resulting construction can then be turned over, and the clinching process is re-applied, so that detents are created on the first layer and protrusions are created on the second layer. This results in two locked layers, with each layer having securing protrusions and detents. Where two separate sheets are used, then the original profiled sheets are brought together, and the multi-clinching process is applied as described above.

Conclusion

The foregoing has constituted a description of specific embodiments showing how the industrial fabric may be constructed and put into use. These embodiments are only exemplary. The invention in its broadest, and more specific aspects, is further described and defined in the claims which now follow.

The invention claimed is:

1. A nonwoven industrial fabric comprising a first layer secured to a second layer, with each layer comprising a plurality of profiling protrusions, with each profiling protrusion forming at least one flow-through aperture, wherein:
   (a) at least a portion of the flow-through apertures of the first layer is aligned with at least a portion of the flow-through apertures of the second layer;
   (b) in addition to the plurality of profiling protrusions, the first layer also comprises a plurality of deformable securing protrusions integral to the first layer;
   (c) the second layer comprises a plurality of detents integral to the second layer; and
   (d) the first layer is secured to the second layer by a plurality of locking pairs, each locking pair comprising a deformed securing protrusion lockably engaged with a detent.

2. The nonwoven industrial fabric according to claim 1, wherein the plurality of locking pairs includes at least one locking pair formed by a detent integral with the first layer lockably engaged with a securing protrusion integral with the second layer.

3. The nonwoven industrial fabric according to claim 1, wherein in each locking pair, the deformed securing protrusion:
   i) protrudes through a detent opening; and
   ii) has an enlarged free end lockably engaged with the detent.

4. The nonwoven industrial fabric according to claim 3, wherein the detent opening is located in a profiling protrusion.

5. The nonwoven industrial fabric according to claim 3, wherein hot staking is used to form the enlarged free end.

6. The nonwoven industrial fabric according to claim 1, wherein in each locking pair, the detent comprises constriction of a detent region that receives and retains the securing protrusion.

7. The nonwoven industrial fabric according to claim 4, wherein clinching is used to form each securing protrusion, each detent and each locking pair.

8. The nonwoven industrial fabric according to claim 1, wherein the first layer and the second layer are both made of a material selected from the group consisting of a metal, a thermoplastic and a thermoset.

9. The nonwoven industrial fabric according to claim 8, wherein the material is a thermoplastic.

10. The nonwoven industrial fabric according to claim 1, wherein the first layer is further secured to the second layer by bonding, and the bonding is selected from the group consisting of through transmission laser welding; ultrasonic welding, adhesives and chemically-reactive systems.

11. The nonwoven industrial fabric according to claim 8, wherein a surface of at least one of the first layer and second layer is treated by a method selected from the group consisting of vapor deposition, nanoparticle treatment and plasma treatment.

12. The nonwoven industrial fabric according to claim 1, wherein the first layer is made of a first material and the second layer is made of a second material different from the first material.

13. The nonwoven industrial fabric according to claim 1, wherein the first layer has a first thickness and the second layer has a second thickness that is different from the first thickness.

14. The nonwoven industrial fabric according to claim 1, wherein:
  i) a first set of abutting strips of the first layer is oriented parallel to a second set of abutting strips of the second layer; and
  ii) both of the first set of abutting strips and the second set of abutting strips are oriented in either: a longitudinal direction of the nonwoven fabric, or in a width direction of the nonwoven fabric.

15. The nonwoven industrial fabric according to claim 1, wherein an exterior surface of at least one of the first layer and the second layer has an averaged surface roughness of between 1 micron and 100 microns.

\* \* \* \* \*